United States Patent [19]

Benhase et al.

[11] Patent Number: 5,201,053
[45] Date of Patent: Apr. 6, 1993

[54] DYNAMIC POLLING OF DEVICES FOR NONSYNCHRONOUS CHANNEL CONNECTION

[75] Inventors: Michael T. Benhase; Florence J. Clark, both of Tucson, Ariz.; William T. Higgins, San Jose, Calif.

[73] Assignee: International Business Machines Corporation, Armonk, N.Y.

[21] Appl. No.: 576,049

[22] Filed: Aug. 31, 1990

[51] Int. Cl.$^5$ .................... G06F 13/00; G06F 13/14
[52] U.S. Cl. ............................... 395/725; 395/325; 364/241; 364/241.1; 364/DIG. 1; 364/940.1; 364/940.5; 364/DIG. 2; 340/825.08
[58] Field of Search ........... 364/200, 900, 241, 241.1, 364/940.1, 940.5, DIG. 1, DIG. 2; 340/825.08; 370/85.8, 95.2; 395/325, 725

[56] References Cited

U.S. PATENT DOCUMENTS

| | | | |
|---|---|---|---|
| 4,425,615 | 1/1984 | Swenson et al. | 364/200 |
| 4,434,466 | 2/1984 | Friedli et al. | 395/725 |
| 4,598,363 | 7/1986 | Clark et al. | 395/250 |
| 4,774,496 | 9/1988 | Tomasevich | 341/50 |
| 4,823,312 | 4/1989 | Michael et al. | 395/250 |
| 4,881,195 | 11/1989 | DeLong et al. | 364/900 |
| 4,958,381 | 9/1990 | Toyoshima | 455/4 |

Primary Examiner—Michael R. Fleming
Assistant Examiner—Glenn A. Auve
Attorney, Agent, or Firm—H. St. Julian

[57] ABSTRACT

A multi-path controller is disclosed for connecting CPU channels with DASD device subsystems. Extended channel connection time are accommodated in the polling of the devices. The request for access signals for the devices are retained for a period of time during which channel connection should be completed and then dropped. The CPU and the controller are freed to complete other work in between the polling cycles. The requests-for-access signals by the devices for connection to the channel that requested the connection does not tie up the channels and the devices while communication is being made.

43 Claims, 3 Drawing Sheets

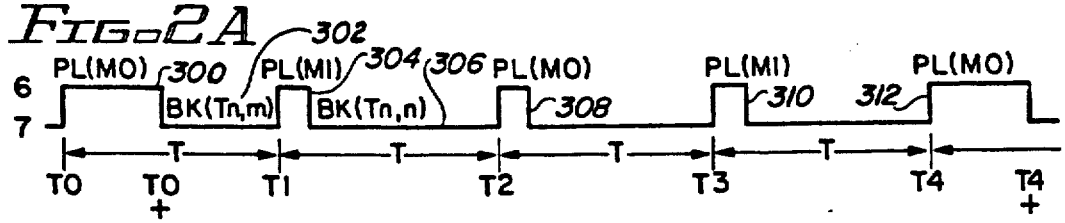
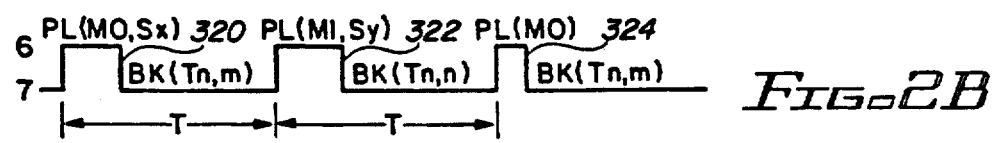
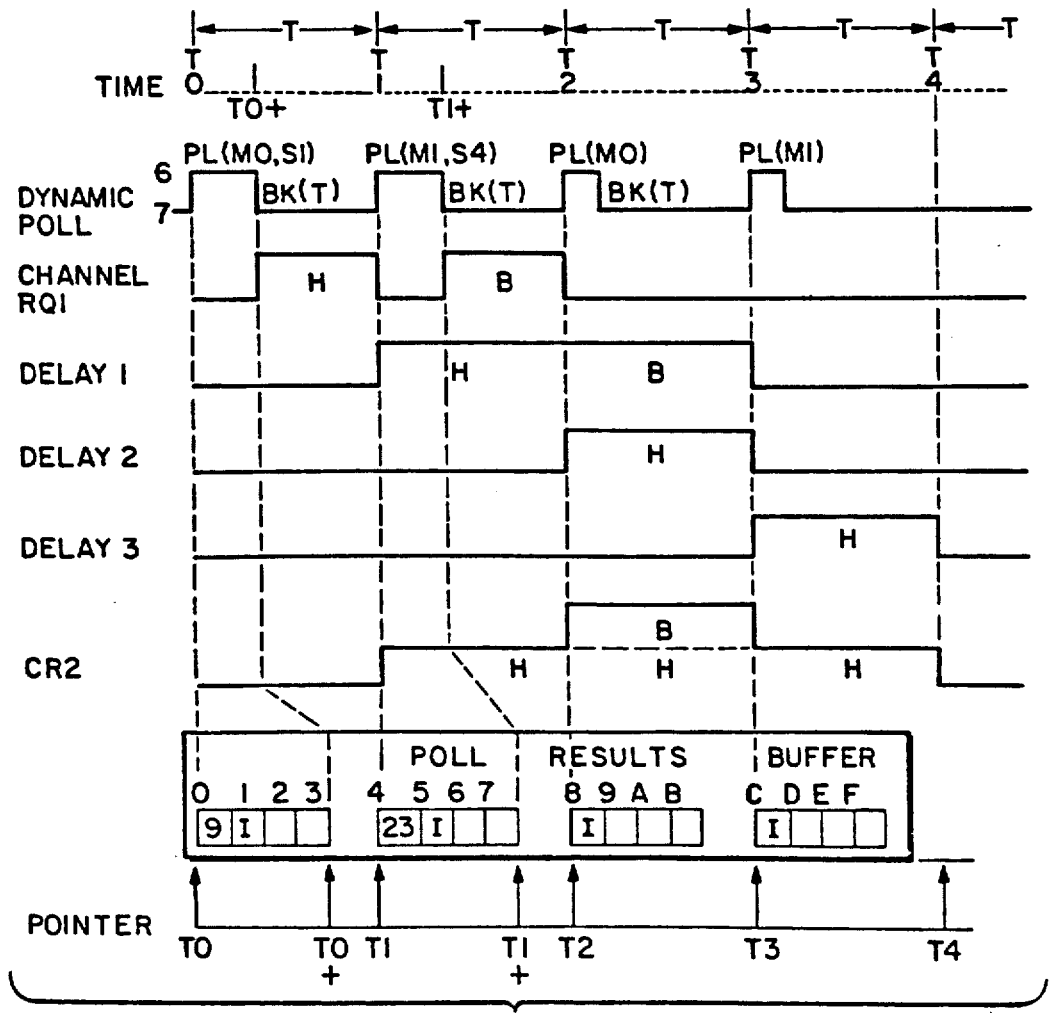

DYNAMIC POLLING OF DEVICES FOR NONSYNCHRONOUS CHANNEL CONNECTION

FIELD OF THE INVENTION

This invention relates generally to the operation of input/output channels in central processing units and in particular to the dynamic polling of devices for nonsynchronous channel operations.

BACKGROUND OF THE INVENTION

Since the introduction of the IBM System/360, nearly all large and intermediate system direct access storage devices (DASD) have used a count-key-data (CKD) track format. The devices respond to a common set of CKD procedural commands used to read and write data to and from the devices.

Certain CKD channel programs have been designed specifically for synchronous operation. Under the CKD commands, the devices and their storage controllers operate synchronously with the system channel. Channel data transfer for each search, read, or write command occurs as the target data field passes the read/write head on the device. The CKD commands depend on this synchronous mode of operation.

Under the synchronous mode of operation, all channel and storage controller activity required to end the execution of one command and initiate the execution of the next must be completed within the gap between two adjunct fields. If the synchronism is not maintained, many channel programs could suffer performance degradation. A write operation is one such channel program.

Channel programs that perform write operations depend on synchronous operations. All write commands must be preceded by a successful search operation and the write command is not sent to the storage controller until the storage controller reports completion of the search operation. Therefore, the completion of the search, the reporting of the outcome to the channel, the receipt of the next command from the channel, and the interpretation of the command, must all occur between the end of the current recording field and the start of the next recorded field.

Geometry dependent channel programs depend on synchronous operation between the channel and the devices. Geometry dependent channel programs are those that assume some vertical alignment of the records and the tracks in a cylinder of the device, and those that employ special technology to process records in a preferred sequence, such as switching from one track to another. Frequently, such programs inserted small filler records between real data records. This was done to effectively increase the size of the inter-record gaps enough to allow the command to be executed between successive commands without requiring an extra revolution of the disk device, for instance. The required size of the filler record typically changes with changes in device types and generally varies as a function of the storage controller. The size of the data records can be selected such that data records themselves function as the filler records, thereby not sacrificing track capacity to the filler records. The selection of data and filler record sizes depends upon an assumption of synchronous operation and may even require program modifications whenever there is a change in device or storage controller operational characteristics.

If the channel programs and the devices cannot operate synchronously, such as when the cable length delays are too long and the inter-record gaps are too short, the performance of the CKD channel programs are effected. The relay time of the channel program reading one or more consecutive records is extended by the amount by which the channel lags behind the device. Channel programs writing one or more records generally incur a delay of one device rotation for each record written. Channel programs updating multiple records lose one revolution for each write command, because each update write command must be preceded by a successful search. Geometry-dependent channel programs tend to incur a delay of one device rotation for each seek or seekhead command in the channel program. A filler record that is just large enough to allow a seek operation in a synchronous environment is not large enough to accommodate both the time required to complete the seek and the amount by which the channel lags behind the device. Adjusting the size of the filler record does not solve the problem, because the amount of lag is not consistent and can not be predicted.

Tape and disk devices are generally controlled by the channels through the use of channel programs which were executed in synchronism with the device. That is, as the fields recorded on the tracks of the devices passed the read/write element of the head, the specific channel programmed commands operating on those fields were executed in real time. This implied certain minimum speed requirements on the channel. For instance, the channel data rate capability must be at least as great as the device data rate. Further, during the inter-field gap between fields of data, it must be possible to signal to the channel at the end of the operation on a given field and also retrieve the command for the next field in time to operate on that field.

At the end of a disconnect period in which the head element is being oriented to the correct track and position on the track for a direct access disk device, it must be possible to reestablish a connection to the channel in time to process the record of entry.

These requirements were not always met, for instance, when the time required to communicate with the channel is increased. This occurs when the channel distance between the device and the CPU is increased. Also, there is an incentive to maximize the capacity of the devices by keeping the inter-field gaps as small as possible. This operates against the increase in channel time because the available time in the inter-field gap is decreased. If this occurs, it may be impossible to, accomplish the command turn around during the inter-field gap time.

Another reason for the requirements of a synchronous channel program is that the utilization of the channels has been increased by the addition of more tape and especially disk devices. It has become increasingly difficult for any device to acquire a channel connection to the CPU in time to process a record following a rotational positioning of the transducer over the disk device. Further, the advancing stages of the device technology has brought into existence devices in which the data rate exceeds that of some currently available channels. The channels have not been able to keep pace with the advancing data rate of the devices.

It is, therefore, an object of the present invention to provide a non-gap synchronous function.

Synchronous channels must meet critical channel response times for the controller and the attached tape and disk devices. Withdrawn interrupts, lost revolutions, command overruns and data overruns will occur if the channel does not respond with its connection commands within the maximum allowable time interval.

It is, therefore, another object of the present invention to remove these channel response time requirements by providing a dynamic polling operation.

Formerly, the synchronous input/output controllers held a channel-request-in signal on the interface for a period of time necessary to insure that the request-in signal was detected by the channel and a connect was accomplished or dropped as being beyond an aging period. This did not seriously effect the performance of the controller. The nonsynchronous I/O controllers support channel connection time is approximately 10 times that of the synchronous controllers. The holding up of other work during the time the poll is made and the actual connection is accomplished can seriously affect performance.

It is, therefore, an object of the present invention to provide an enhanced dynamic polling of a nonsynchronous channel.

SUMMARY OF THE INVENTION

With the present invention, the devices of a nonsynchronous I/O controller are, continually polled at a frequency set to accommodate the connection time to the channel. Much longer length of cables are allowed with the use of nonsynchronous controllers. The longer length of cables requires a variable delay in the response after a device is polled. The shortest delay sets the polling frequency, while the longest delay sets the number of polling cycles the request must be held before connection is accomplished. During the time that no polling is taking place and no communication is accomplished, the channels and controllers are free to communicate with and service lower level interrupts. The request-in signal is not held up for the delay of the longest cable since the polling of the device is performed at a frequency set to sense request-in commands from different lengths of cable delays and to service the connection at a frequency such that the shortest, the medium, and the longest cable length devices are retained according to the delay connect time.

In the present invention, a dynamic polling device for an I/O controller manages requests for channel connections from devices, i.e., tape or disk drives for instance, by holding the request for the time required for a response from the channel, while servicing the request without unnecessary delays. The dynamic polling device includes means for polling the devices to discover requests for access signals. A poll of the devices is made at a set frequency determined by the shortest and the longest delay time expected between the devices and the I/O controller. The request for access signal is stored and shifted in a storage means after each poll is made of the devices. The delay time of each channel is stored in the storage means together with the request for access from the device. The request for access signal is presented to the I/O controller and aged for the time the connection response from the channel is expected to be received, as determined by the position of the request for access signals in the storage means. If the connection is not made, the request for access signal is dropped as being stale since the response from the channel was not received within the time allotted for the response. The request for access is made if the connection response is timely received.

Each request for access is retained for connection to the channel according to the communication response time delay to the device requesting access by the shifting of the request for access signal into a particular section of the storage means, which section pertains to the time during which a channel connection should have been made.

A further objective of the present invention is, therefore, to insulate the channel and the controller from the timing requirements required by the communication delays between the channels and the supported tape and disk devices.

The foregoing and other objects, features and advantages of the invention will be apparent from the following more particular description of preferred embodiments of the invention, as illustrated in the accompanying drawing.

BRIEF DESCRIPTION OF THE DRAWING

FIGS. 2A and B is a timing diagrams of the polling procedure of the present invention.

FIG. 3 is a timing diagram of the specific portions of the polling procedure of the present invention.

DESCRIPTION OF THE PREFERRED EMBODIMENT

Figure 1:
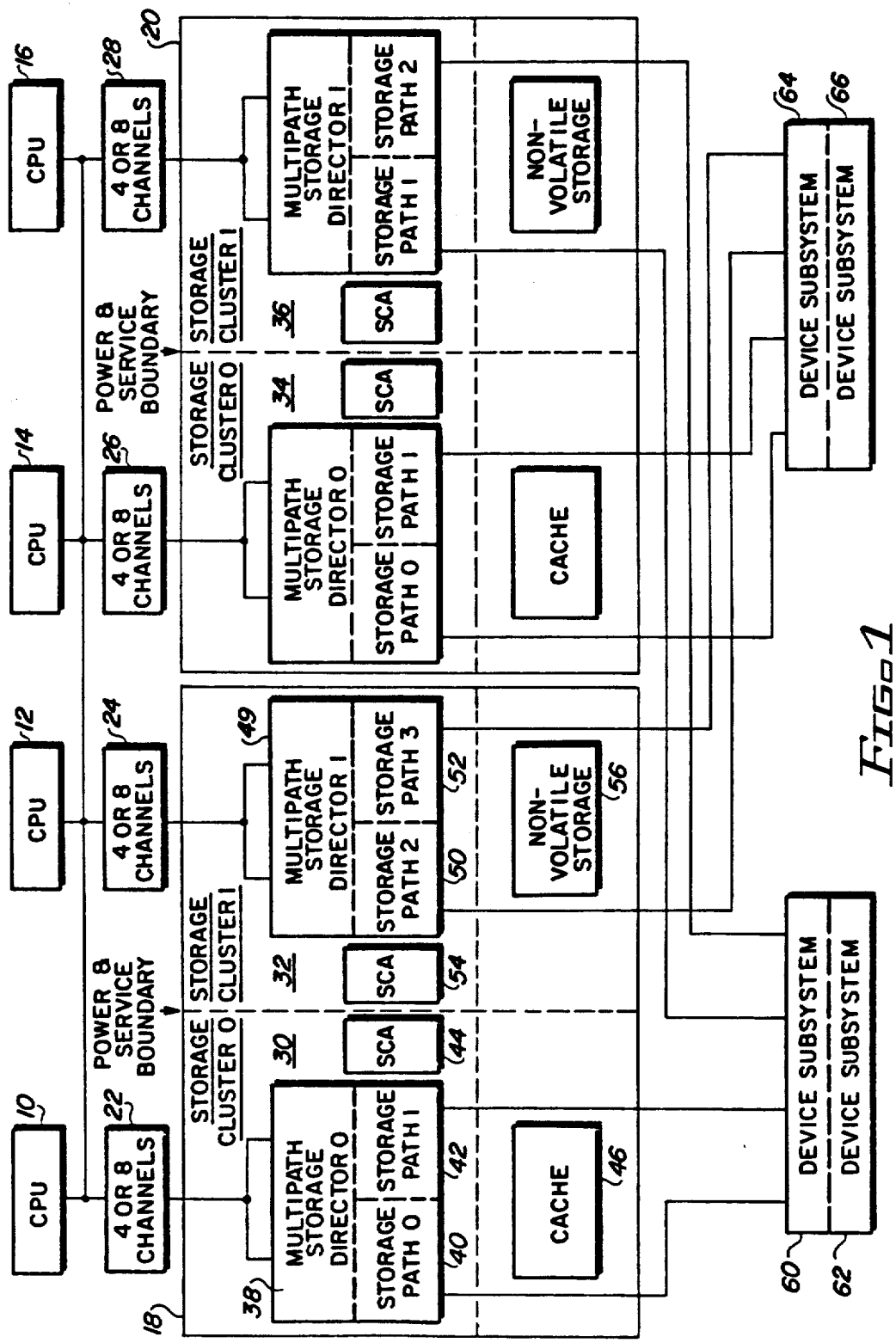
FIG. 1 is a block diagram of a data processing system and the communications between the parts of the system to practice the polling procedure of the present invention.

To get the best performance of the system as shown in FIG. 1, a nonsynchronous architecture uses a multi-storage path architecture, while providing the dynamic reconnection over the four storage paths. The nonsynchronous system needs to know the nature and scope of an I/O operation before it begins transferring data between the storage controller and either the channel or the device. To provide such information, the count-key-data (CKD) command set has been extended by the addition of several new commands to form the extended count-key-data (ECKD) command set. The principal objective of the ECKD command set is to permit channel programs in which the nature and scope of data transfer operation is completely described before the first data transfer command is executed, i.e., predictive channel programs, thereby keeping the storage subsystem knowledgeable of what is going on during data transfer operation. To inform the storage subsystem of the intent and scope of the data transfer operation, a locate record command is used to convey the type of data transfer to be performed, the number of records to be operated upon, and the track, sector, and record identifier to which the device must be positioned prior to initiating data transfer. The ECKD command set also includes a defined extent command which defines the range of tracks over which the channel program can operate and defines certain attributes of, and limitations on, the commands that follow the defined extent command in the channel program.

Nonsynchronous operation is defined as the mode in which the channel and control unit activities required to end execution of one command and initiate execution of the next do not necessarily occur within a single inter-record gap. With nonsynchronous operations, the channel could run somewhat behind the device on a read operation, and somewhat ahead of the devices on a write operation. The amount of lead or lag time observed in the execution of a channel program will typically depend on the current operating environment, rather then on the fixed property of the device or storage controller. Nonsynchronous operation does not define how far apart in time the channel and the device operations must be, and does not limit how far apart they can be. During read operations, the storage controller could read a few bytes, a field, a record, or even several records into a buffer before the first read command is executed. In write operations, the storage controller could receive one or more write commands and transfer the associated data into a buffer before the first field is written to the device. The extended-count-key-data (ECKD) command set uses the same track addressing scheme as the CKD command set. The track is the smallest directly addressable space on a device. Each track has an arbitrary starting point called an index. An ECKD command set specifically defines tracks such that the track may or may not correspond to a full device rotation. The tracks are grouped into sets called cylinders. The ECKD command set defines a cylinder to be an arbitrary grouping of tracks.

The only requirement is that all cylinders contain the same number of tracks and that tracks within a cylinder be numbered consecutively starting with zero. The ECKD command set promotes the construction of straight forward channel programs to perform data transfer operation and denies any reliable imprints of device geometry underlying the track and cylinder arrangement of the device. The track format is the same in ECKD command set as it is in the CKD command set. The first area on the track is the home address, which identifies the track and indicates its status, that is, whether it is a usable track or a defective track. The home address is followed by a special record called record zero (R0). The record ID in the record zero R0 count area must be CCHHO, where CCHH is the address of the track. The record zero can be followed on the track by one or more records which are called user data records. User data records can have key areas, with a maximum length of 255 bytes. A record must be wholly contained on a single track. The record ID field in a user data record count can contain any 5 bytes of value and can be named according to any pattern. The common convention is that records be assigned IDs of the form CCHHR, where R is the ordinal number of the record of the track.

Before the storage controller can transfer data to or from a device track, it must know the position of the read/write head mechanism, relative to the areas already recorded on the track. As data transfer operations progress, the storage controller must continually maintain that state of awareness or orientation. The storage controller detects either the index point or the start of a count area other than record zero. Once a count area or index has been detected, the storage controller can work its way down the track, while always being aware of the type of area passing under the read/write head. Specific orientation states used to describe or define the operation of data excess and data transfer command include index, home address, count, key, and data. The index state means that the read/write head is located between index point and home address. Similarly, each of the other states means that the read/write mechanism is positioned between the end of the corresponding area and the start of the next area on the track. Execution of a locate record command establishes orientation which is then maintained throughout the sequence of consecutive data transfer commands. Execution of any command other then a read, write, or search command resets the orientation and the storage subsystem must reorient before data transfer can resume. The ECKD command set extends the scope of multi-track data transfer operations by allowing the operations to cross cylinder boundaries, as well as track boundaries. The fundamental write operation in ECKD is a locate record domain. Successful completion of the write operation is signaled by presentation of the device end status for the last write in the locate record domain. Device end status for all but the last write command means only that the data has been transferred to the buffer of the storage controller. Nonsynchronous operation permits the execution of one or more write commands, and transfers data from the channel to the control unit before any data is actually written on the device. Channel end status is received for each write command after the data transfer from the channel is completed. If another write command is expected in the locate record domain, a device end status is received together with a channel end. Otherwise, the device end status is presented when the write operation is completed at the device. When the device end status is received from the last write command in the locate record domain, the data has been transferred to the device.

Multi-track read operations outside a locate record domain are permitted as long as the next track is within the extent define by the defined extent command. If, after switching heads, the storage controller does not find the record to operate upon, that is, the track is empty, the storage control switches heads again and continues until a non-empty track is found or the end of the cylinder is reached. Multi-track operations are permitted for writes as well as reads. Multi-track operations are permitted to cross both track and cylinder boundaries as long as the next track is within the extent defined by the extent define command. Multi-track write operations are only allowed within a locate record domain.

In the ECKD channel program, a define extent command must precede the first locate record in a channel program. It's primary function is to allow the operating system to exercise control over the tracks that a user can and cannot access, and over the operations that can be performed in a channel program. A locate record command allows the storage subsystem to predict what will happen in a channel program.

It informs the subsystem of the intent and scope of the data transfer operation before the receipt of the first read or write command. After the locate record command, standard CKD read and write channel commands transfer the data.

A channel command chain can contain only one define extent command. The define extent command can be prefixed to a users channel program by the operating system. The define extent command specifies the range of tracks over which the channel program can operate and then defines certain attributes of, and limitations on, the commands following the define extent command in the channel program. An extent is a set of consecutively addressed tracks that can be accessed by a channel program. It is defined by specifying the addresses of the first and last tracks in the extent.

The locate record command specifies the type and scope of the data transfer operation. The locate record command must be preceded by a define extent command. The locate record command identifies the type of data transfer to be preformed, the number of records or tracks to be operated upon, and the track, sector, and record ID to which the device must be oriented prior to initializing the data transfer. The information provided by the locate record parameters completely defines the read or write operation to be performed by the data transfer commands in the domain of this locate record command. The domain begins with the transfer of the locate record parameters and extends through the last operation identified by those parameters. After validating the locate record parameters, the storage control directs the device to seek, to the specified track, positions the device to the desired sector, and begins a search operation to further position itself to a particular record area on the track. The ECKD command sets supports the reading and writing of key areas and the formatting of records with keys within a locate record domain but does not provide a key search operation in the locate record command. Depending on the type of operation to be performed and the specific storage control design, the storage control could disconnect from the channel after processing the locate record parameters or it could immediately begin executing the data transfer commands that follow locate record.

Orientation is reset in the storage controller when a locate record command is received. The subsequent execution of each locate record command establishes a new orientation state before any data is transferred to or from the device. In addition to the define extent and the locate record commands, the extended-count-key-data (ECKD) command set adds three write commands, a full track read track command, and a read device characteristics command. The first added command is the write CKD next track command. This command is valid only in a locate record domain and must follow a write CKD or another write CKD next track command. This command causes the storage controller to erase the remainder of the current track, switch heads to the next track, pass over record zero, and format the first user data record on the new track. The write CKD next track command is provided to permit multiple tracks to be formatted in a single locate record domain.

The next command added is the write update data command. This command is valid only in a locate record domain and must be immediately preceded by a locate record or another write update data command. The write update data command functions much like the write data command except that it has different prerequisites and is a multi-track command. If there are no more records on the track when the write update data command is executed, the storage controller switches to the next track and updates the data area of the first user record on the new track.

The third added write command is the write update key and data command. This command is valid only in a locate record domain and must be immediately preceded by a locate record or another write update key and data command. The write update key and data command functions much like a write key data command but it has different prerequisites and is a multi-track command. If there are no more records on the track when the write update key and data command is executed, the storage controller switches to the next track and updates the key and data area of the first user data record on the new track.

The read track command added in the ECKD transfer commands is valid only in a locate record domain. This command reads every record on a track, including the end of file records. The first read track command in a locate record domain orients to the beginning of the first count area, including record zero, following the orientation established by the locate record command. This command transfers each count, key, and data area on the track until the end of track is reached. Subsequent read track commands switch to the next track and transfers the count, key, and data areas on that track, until the end of track is reached. After the last record on the track has been transferred, a pseudo count field is transferred. If there are no records on the track to be transferred, the read track command transfers only the pseudo count field. The pseudo count field can be used to locate the end of the track image characters string in the host systems main storage. The read track command is designed to read an entire track. The byte count must be at least as large as the sum of all of the count, key, and data areas on the track plus the eight byte pseudo count field. If the byte count is too small, the data transfer will end before all of the data from the track has been transferred to the channel and the track image in the main storage will not contain the end of track marker.

The read devices characteristics command added to the ECKD transfer commands enables a program to determine the operational characteristics of the storage subsystem. The information transferred identifies the device type and storage controller type and specifies some of the program visible features of the storage subsystem. Information, such as the number and addresses of primary, alternate, diagnosis, and device support tracks are provided.

Referring now to FIG. 1, there is shown a multi CPU and shared device configuration. A plurality of CPU systems identified with the reference numerals 10, 12, 14 and 16 are suitably cross connected to a pair of controller systems 18 and 20, via a plurality of channels 22, 24, 26 and 28. Each controller system, 18 and 20, includes two storage clusters.

Controller system 18 includes storage clusters 30 and 32, while controller system 20 includes two storage clusters 34 and 36. Storage cluster 30, for instance, includes a multi path storage directory 38, which in turn includes two storage paths 40 and 42. Each storage cluster 30 also includes a shared control array (SCA) 44 and can include a cache memory system 46. The storage cluster 32 includes a multi path storage director 49 and two storage path controls 50 and 52, as well as its own shared control array (SCA) 54. Storage cluster 32 includes a nonvolatile storage 56. The controller system 18 has its storage paths 40 and 42 connected to a plurality of devices divided into two device subsystems 60 and 62. With the device level selection enhanced mode of data transfer, simultaneous data transfer is possible over all four storage paths, within the same four path string. Each device subsystem 60 and 62 has communication with each storage path 40 and 42 of the storage cluster 30 as well as communication with the storage paths of storage cluster 36.

Two device subsystems 64 and 66 are connected to the storage paths 50 and 52 of the storage cluster 32 and the storage paths of storage cluster 34. Both sets of device subsystems 60, 62, and 64, 66 operate in tandem, as controlled by the controller systems 18 and 20.

Each of the storage clusters in each of the controller systems operate as independent components. Each storage cluster provides a separate power and service region and two separate paths to the devices. The loss of power to one storage cluster does not prevent access to data because the processing can continue through other storage clusters. All of the devices connected to the controller systems are cross configured to both controller systems and to one storage cluster within each of the controller systems. The devices in the device subsystems 60 and 62 are generally direct access storage devices (DASD) disk devices, although the devices could be tape or optical devices. Each storage cluster has its own support facility. Each storage cluster contains a vital product data storage module that stores the features of the controllers, the subsystem mode of operations, the subsystem identifiers, the subsystem configuration, the controller unit addresses for each channel, the type of channel and the channel speed connected to each storage cluster and the number of addressable devices that can be attached to the logical systems in the devices block.

The device level selection enhanced mode of operation permits two multi path storage directors to access data in the device subsystems. Each multi path storage director has two storage paths, as shown in FIG. 1. The device level selection enhanced mode provides four independent and simultaneous data transfer paths to the same two device subsystems from the two controller systems. The input/output operation can be dynamically reconnected on any one of the four paths. Thus, there are four complete independent paths from the CPU to the devices.

Each storage cluster 30, for instance, contains channel attachments to connect the channel 22 to the multi-path storage director 38. The storage director 38 is connected to the two storage paths 40 and 42. The storage cluster 30 includes the shared control array 44. The cache 46 and the nonvolatile storage 56 are shared by the storage path in both the storage cluster 30 and the storage cluster 32, but are physically and logically separate from the storage clusters. Each storage cluster is an independent component. Each provides a separate power and service region and two separate paths to the device subsystem. Cache and nonvolatile storage are accessed by both storage cluster in one controller system. The storage director interprets channel commands and controls the storage paths, the cache, the nonvolatile storage, and the attached devices in the device subsystem. Each storage path is separately connected to all devices in the device subsystems. During a channel connected operation, the storage path is coupled with a particular channel. The multi-path storage director provides, through a single channel address, multi-path access to the devices. Through one storage director address, the multi path storage director selects either storage path in the storage cluster for data transfer operation. The shared control array contains the status information about the storage paths and the devices.

Each set of device subsystems, device subsystems 60 and 62 for instance, is connected to both controller systems 18 and 20. Each has a line to each storage path, storage path 40 and 42, for instance, of each storage director, storage director 38, for instance. Thus, device systems 60 and 62, for instance, has four paths to the CPU's, two to storage cluster 30 of controller system 18 and two to storage cluster 36 of controller system 20. Thus, on a poll sequence, an interrupt request from a device in either device subsystem 60 or 62 will be sensed by all four storage paths. Any one of the storage paths can satisfy the interrupt.

The cache 46 is a high density, electronic storage that is shared by all storage paths connected to the controller system 18. Frequently used data can be transferred to and from the cache 46 and the channel 22 at channel speeds. Access time between the cache 46 and one channel of the channels 22 is much faster than between the devices of the device subsystems and the channel because there are no delays. The cache 46 is in a separate power region from the storage clusters 30 and 32 to permit the cache processing through either storage cluster when the other storage cluster is off line for any reason.

The nonvolatile storage 56 provides random access electronic storage. A battery backup system maintains power to the nonvolatile storage 56. The nonvolatile storage holds the data that needs to be transferred to the devices of the device subsystems 60 and 62. If power is lost to the controller system 18 before the information can be transmitted to the devices, the data is held in the nonvolatile storage 56 until the power is restored, at which time the data is destaged to the devices.

The shared control arrays 44 and 54 are electronic storage that contain the information about the status of the controller system 18 and the attached devices in the device subsystems. Identical information is kept in the shared control array of each storage cluster. In the pairing, such as shown in FIG. 1, the shared control array information is duplicated into the two storage clusters that are paired together. For instance, the shared control array 44 of storage cluster 30 is paired to a shared control array SCA in the storage cluster 36.

The present invention is directed to the dynamic polling of the devices in the device subsystems. The basic function of the dynamic polling of the devices is to scan for tasks that are ready to be performed at the interface between the device subsystems 60 and 62, for instance, and the controller system 18. The tasks may be those which merely require an interface from the devices to the parts of the controller system, such as the cache 46, or it may require connection to the channels for interface with the CPUs. These tasks include translating device interrupts into channel requests for reconnection on disconnected channel programs; a reconnection to a disconnected program for a cache staging or destaging; a pack change notification to the attached systems; or a device locate task, that is, a seek and set sector that has been queued by a program from the channel or a cache staging or destaging program. One function, polling, is changed and one function is added in this invention. These functions are required to support the nonsynchronous environment. The additional function is to maintain the channel request-in signals (RQI'S) in a register for an extended period of time to accommodate the longer channel cable transmission delays generally available in the nonsynchronous environment. When required, time is needed to support the cable extension and the serial channel interface between the controller system 18 and the channels 22 in order to service the RQI signals without unnecessarily holding up the servicing of other requests of lower level priority.

It should be understood that for the discussion of the preferred embodiments, the poll sequence will be discussed for polling of device subsystems 60 and 62 by storage cluster 30 of the controller system 18. It should be understood that at the same time that the poll is made of the device subsystem 60 by storage paths 40 and 42 of the storage director 38, a poll is made of the device subsystem 60 by the storage paths of the storage cluster 36. Further, at that time, a poll is made of device system 64 by the storage paths of the storage cluster 32 and the storage cluster 34. Likewise, when the poll is made of the device subsystem 62, a poll is made of the device subsystem 66 by the storage paths of their associated storage clusters. Four separate paths are available for each device interrupt sensed.

The polling function executes as a task at the interrupt levels 6 and 3 of the controller system 18. Periodically, the polling function interrupts the tasks which are currently being executed on the controller systems interrupt level 7. The polling function scans the device subsystems for work items that can be performed at interrupt level 6 for instance, and then returns control to the task that was preempted when the controller system was operating at interrupt level 7. The interrupt mechanism for the polling function is provided by a programmable interrupt timer. The frequency of the polling interrupt is determined by the length of the sector interrupt provided by the attached devices of the device subsystem 60. Polling must be activated with sufficient frequency to insure that all devices requesting a connection will be detected and serviced at a time to avoid any lockouts from the servicing of level 7 commands, while avoiding reconnect misses that will further postpone the servicing of the device at the interrupt level 6.

By definition, the polling function is a background task which executes concurrently with other background tasks on interrupt level 7. Polling, therefore, executes in two different modes depending on the type of tasks currently executing in the background on level 7. When the storage path is not performing a background task while connected to a channel, or utilizing cache hardware associated with a channel interface, then a full poll interrupt is executed. In this mode all of the above mentioned polling tasks are executed. A full poll interrupt requires a connection to the channel. If the channel is busy with the controller system 18, than a limited poll interrupt is executed. In the limited poll interrupt, only tasks that require connection between the device subsystem 60 and the controller system 18 are executed. These tasks could be device locate tasks or staging or destaging operations with the cache 46, for instance.

FIG. 2A shows the poll duty cycle for the present invention without any interrupts sensed during the polling cycles. In a time period 300, storage path 40 is polling its devices in the device subsystem 60, see FIG. 1. Also, in the time period 300, a check is made for device work to be started. For the preferred embodiment, the time period 300 is 17 microseconds in length. For this time period the storage director 38, and thereby, storage path 40, remains at level 6 to poll for interrupts on the devices in the device subsystems 60. With no interrupts after the time period 300, the storage director 38 returns to perform background tasks for the next period of time 302. At a time period 304, a poll is made for storage path 40 to the device subsystem 62. Time period 304 for the preferred embodiment is 8 microseconds. This is a shortened period of time because no check is made for device work initiation requests. Since FIG. 2A is showing the poll duty cycle for no interrupts in a time period 306, the storage director 38 returns to performing background tasks. For the preferred embodiment, time period 306 occupies 57 microseconds. The servicing of device work initiation requests is only done in the polling of the storage path 40 for every fourth time and therefore in a time period 308, only the polling of the device subsystem by the storage path 40 is provided. This time the preferred embodiment is again for 8 microseconds. The cycle repeats to poll device subsystem 62 in a time period 310. Then in a time period 312, the polling of the device subsystem 60, as well as the servicing of the device work initiation requests is repeated as occurred in the time period 300. The servicing of the device work initiation requests is performed only every other time period for polling the device subsystem 60 in order to permit an increase in the amount of time that the background work can be serviced. Thus the device work initiating request is serviced in the time periods 300 and 312 but is not serviced in the time period 308. FIG. 2B shows the poll duty cycle with substring interrupts.

Storage paths 40 and 42 operate on different timers. Both would probably not be polled at the same time. For instance, if storage path 42 was in the process of servicing a start I/O signal from the channel, it would not be going through a polling cycle but storage path 40 may be. Storage path 42 would start polling when the start I/O procedure was completed. Storage paths 40 and 42 run on different timers.

Referring to FIG. 2B, in a time period 320, a poll is made from storage path 40, for instance, during which time an interrupt is uncovered and the substring poll is made of the devices in device subsystem 60, for instance. The time period 320 is 20 microseconds in length for the preferred embodiment in order to service any 20 microsecond channel and to age any longer channel lengths as will be discussed in more detail following. In a time period 322, the poll is made of the device system 62 and the substring is checked and an interrupt is found and serviced. The background tasks are again serviced after the time period 322. The duty cycle continues to a time period 324 where the first device subsystem 60 is again polled and for this time period no substring interrupts were uncovered and therefore this period is a short period which, for the preferred embodiment, is 8 microseconds long. A longer time period is not shown because this is a second poll of the first storage path. The device work initiation requests, if any, would have been serviced in the time period 320 as shown in the flow chart of FIG. 4A. The duty cycle continues in FIG. 2B with either a repeat without interrupts as shown in FIG. 2A or with interrupts as shown in FIG. 2B. The cycling of the poll requests and the interrupt connections or misses, together with the aging registers and the channel registers, are shown in FIG. 3.

FIG. 3 shows one request-in (RQI) life cycle spread out over the four T time which, for the preferred embodiment, is the maximum amount of delay time that a request-in can be held before the channel requires a connection. FIG. 3 shows that channel B is going to request a poll and it requires a 65 microsecond aging delay from the device 23 of the device subsystem 62 and channel H is a 195 microsecond delay and that request is coming from device 9 of the device subsystem 60. In FIG. 3, the dynamic poll time shows that when the polling occurs in the first time T0, the device subsystem 60 is polled and at the second time T1, the device subsystem 62 is polled. In between the polling cycles the level 7 background tasks are serviced. The cycles repeat to again poll the device subsystem 60 at time T2 and to poll the device subsystem 62 again at time T3. The channel request-in (RQI) signal line shows that, between time T0 and T1, channel H is requesting connection, and between time T1 and T2, channel B is requesting access. The channel request in (RQI) signal and the time T1, 2 and 3 signals form the output from the aging registers which hold the channel requests through the maximum delay time, which is 3T. In the preferred embodiment, each T time provides a 65 microsecond delay. The aging registers show the transfer of the channel request through the cycle until either the connection is made or the request is denied because no connection response was received from the channel within the time delay set. The CR2 register stores all of the channels requests and identifies to the system which channel is requiring connection. The poll results buffer stores the device addresses of the channels that are requesting connection. The poll results buffer passed the device address, with interrupts, to the channel manager. This buffer holds four substrings of device addresses over the four consecutive poll cycles. This is required to accommodate the aging for the 3T time or 195 microseconds. On the 5th poll cycle at T4 time, the poll results buffer wraps around and starts again at the beginning, i.e., T4 time is the same as T0 time except it is not an initial or starting time. On each poll cycle, either responding device addresses are stored in the buffer, or if none, then invalid substring addresses I are stored in the block of four words for each of the T times. A secondary page register assigned to the poll process is established as a pointer to the poll results buffer and is used to maintain a correlation between the poll cycle and the poll results buffer. Each subsequent poll cycle uses the pointer to access the four words associated with the current cycle. The channel manager, via a device manager service routine command, uses the pointer to scan the poll results buffer for a device address to present to the channel that is responding to a request-in (RQI) cycle. The channel manager in turn identifies the selecting channel to the service routine. The service routine scans the poll results buffer for a device address with an active request-in signal for the selecting channel. The scan routine command searches a maximum of two words for any 20 microsecond channels. For the longer channel delays, the routine scans all four words of the current cycle that has the channel match in the aging register. Since a scan is only made when a match has been completed, the poll results buffer is not reset when the poll is restarted. The pointer should be considered valid by the channel manager whenever the device manager is inactive.

The polling cycle uses two sets of byte vectors for steering the device interrupts into either a channel request-in or a device manager invocation to process a reconnect to the channel. The two sets of byte vectors are used for external and internal interrupts, respectively. The two sets of device significant byte vectors reside in the shared control array (SCA) and are used to associate the device interrupts with either a channel program, an ICC program, or an unexpected pack change.

The four secondary page registers assigned to the poll process, channel RQI delay, delay 1, delay 2, and delay 3, are established as aging register and contain the request-in (RQI) signals as they are being aged over multiple poll cycles. The registers are initialized to zeros when the poll process is started, at time T0 in FIG. 3, and are used by the subsequent poll cycles to shift the request-in signals through an aging process.

Three secondary page registers are assigned to the poll process as aging mask registers. These registers contain a channel byte mask which identifies the channels with their respective request-in window. The request-in windows are for the four T times and the preferred embodiment are the 20, 65, 130, or 195 microsecond aging time. The aging mask registers reset the channel interface RQIs that are stored in the aging registers which have out lived their predefined useful lives. When their time for the connection to the channel is to be made, either the connection is made to the channel or the request is dropped as being beyond its useful life. Interrupt requests in the aging mask registers and the connection time to the channels are determined at the connection time and updated as background task. The change in the aging mask will occur whenever the poll cycle is restarted. Any higher level interrupt, such as a channel selection, causes a restart of the poll cycle. Starting device work for storage path to support facility communication also causes a restart.

The dynamic RQIs are merged with the static RQIs between poll duty cycles. A data object in the control storage is created to contain a image of the static interrupts so that poll can differentiate the static from the aging dynamic. The data object is managed by the background process responsible for raising and maintaining the static interrupts.

Referring now to FIG. 3, the channel B and H RQI signal life cycle is shown for a life cycle of 65 microseconds for channel B and 195 microseconds for channel H. Device 23 is requesting connection from channel B and device 9 is requesting connection from channel H, as noted in the CR2 register. At time T0 in FIG. 3, when the dynamic poll is initiated, the aging registers have all been cleared, as well as the CR2 register. On the first poll cycle at time T0, device 9 is detected requesting access to channel H. A device 9 indication is set into the poll results buffer and, at time T0 plus, the channels request in aging buffer has stored that the H channel is requesting access. Since only device 9 is requesting access, the poll results buffer zero stores the device 9 indication while the poll results buffer one is set to an invalid (I) to indicate that only the one device, device 9, is requesting the connection. At time T0 plus, the pointer has stored all of the devices requesting access and as shown, the pointer points to the last buffer in the first section. At time T0 plus, the channel RQI aging buffer has the channel request from channel H stored therein. At the second dynamic poll cycle, time T1, the device 23 of channel B is requesting access. The poll results buffer 4 will contain the device 23 and since this is the only device requesting access from channel B, the poll results buffer 5 will contain the invalid address I. At time T1 plus, the B channel request is placed into the channel RQI aging register and the pointer is now pointing to the end of the second time cycle, T1+. At time T1, the H channel request from the channel RQI register is shifted to the delay 1 aging register.

At the time T2 dynamic poll, the H channel request stored in the delay 1 aging register is shifted to the delay 2 aging register and the channel B request stored in the channel RQI aging buffer is shifted to the delay 1 aging register, as shown in the signals in FIG. 3. In the poll cycle following time T2 to T3, the connection must have been made to the device 23 of channel B. In any event, the device request will be dropped. The CR2 register contains both the channel B and channel H request. At time T2 plus, the B channel is ready for connection because of the 65 microsecond delay as indicated by device 1, and with the pointer pointing to the third set, the system checks the second set to see the devices that were requesting access from channel B. In this instance, device 23 of channel B has been requesting access and connection, if any, is made at the polling time following time T2. After the polling that is made at time T2, the poll process returns from interrupt to the background process at level 7.

At time T3, the request from channel H continues to be aged by shifting the channel request from the delay 2 register to delay 3 register. The channel request from channel B has been fully aged since it was a 65 microsecond channel and the channel B request is dropped at time T3. The channel request B is also dropped from the CR2 register at time T3. The pointer at time T3 shows that only an invalid indication was stored in poll results buffer, which shows that no device requested access. At time T4, a dynamic poll is made of the device subsystem 60. The 195 microsecond channel, channel H, is in the delay 3 aging register and before the polling cycle at T4, connection is required. The CR2 register stores the channel responses that are requesting connection. The channel connections are made to the signals raised in the CR2 register. The channel request signals from the aging registers are transferred into the CR2 register. Thus at time T1 only the H channel request is in the aging registers and therefore only the H is placed into the CR2 register. At time T2 both B and H channel requests are in the aging registers and the therefore both the B and the H requests are placed into the CR2 register at time T2. At time T3, the B channel request is being dropped as beyond its aging time and only the H register request is still active and therefore between time T3 and T4 only the H channel request is contained in register CR2. The maximum 3T time for the channel connection is reached at time T4 and therefore at or before time T4 at the polling of the storage cluster one, the connection must be made to the channel H. At time T4, the H channel request stored in the delay 3 aging register is aged out. Time T4 is essentially a repeat of time T0 because the poll cycle steps of time T0 are repeated. Thus the dynamic poll is made of the storage path 40 for, the polling time. If for instance, any channel connections would have been made in the later positions of the first cycle, i.e., time T2 or T3, poll would be restarted at time T0 and all aging resisters and CR2 would be cleared.

The insertion of the invalid (I) signal into the poll results buffer, either into the first buffer when the section is being checked or in subsequent sections if there are devices requesting access is used to shorten the amount of review that is made of the poll results buffer. The scan of the poll results buffer is made to check for any devices requiring connection. Once the check returns an invalid or I signal, no further search is made through the poll results buffer. The invalid address stops any further searching of that section in the poll results buffer.

The present invention is directed toward the detection of the interrupts as presented by the devices in the device subsystems 60 and 62 (see FIG. 1). The polling procedure itself does not reset the interrupts, nor service the interrupts. The dynamic polling of the present invention notifies the controller system that an interrupt is present and keeps the notification of the interrupt active until either serviced by the channel from the CPU or until the polling drops the interrupt to the channel because the device generated interrupt was aged over the period of time necessary for the channel to connect to it, but no connection was made. If the channel had not made the connection within the time that the interrupt was aged, it is an indication that the channel was busy doing other work and will not service the interrupt at that time. The device can raise its interrupt again, and the dynamic polling sequence will sense this interrupt and again raise the interrupt to the channel and keep it active for the aging period necessary for the channel to respond. The delay for the channel response, as previously stated, is due to the long cable length required for present day data processing systems. The raising of the interrupt can be in response to a channel request for access to the device and the device responding that is it now ready for connection to the channel.

The dynamic polling procedure can also sense an internal interrupt and notify the device manager for an interrupt that is internal to the controller itself. The internal work could be connection to the cache 46, for instance. The connection to the channel or to the device manager for polling within the controller is known in the prior art and will not be discussed further herein. The dynamic poll procedure may be in any step at the time the connection is made to the channel. The channel is on a higher interrupt level so when the channel responds to the request the dynamic poll procedure is interrupted so that the connection can be made to service the interrupt stored in a previous polling procedure. After the device manager completes its work with the device or the channel has finished with its work with the devices, the dynamic poll cycle is rescheduled and again operates in the procedure being discussed.

Figure 4A:
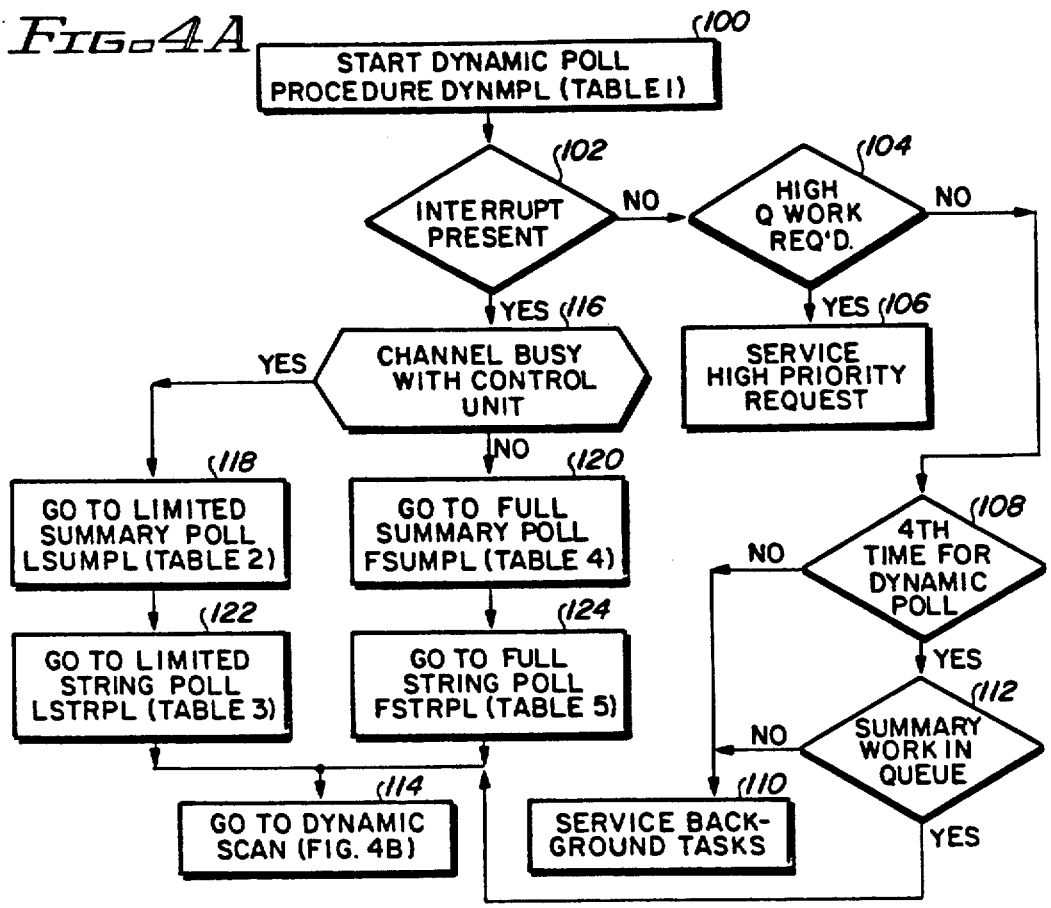
FIG. 4 A–C are logic flow diagrams of the polling procedure of the present invention.
Figure 4C:
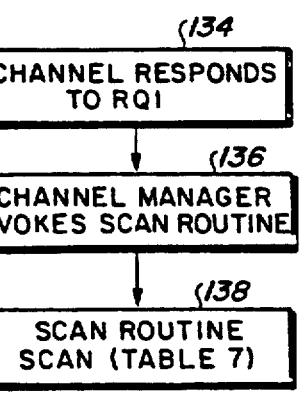
Figure 4B:
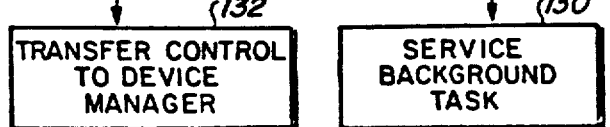

The dynamic poll procedure of the present invention is shown in FIGS. 4A–C. The procedure receives control from the controller programmable interrupt timer every T time as shown in FIG. 3. The T time for the preferred embodiment is 65 microseconds. Any interrupt for a 65 microsecond, 130 microsecond or 195 microsecond channel found by the previous poll sequences is aged, that is keep alive, for the time required to service the channel requesting connection to that device. All current dynamic RQIs are aged and any RQIs that have expired are dropped. This permits the interrupt to be kept active for the time necessary for a response from a long cabled channel, but the request for connection is not kept active beyond that time. A summary poll tag is issued to only one device subsystem of each controller system, one each time the dynamic poll procedure is invoked. If this summary tag services interrupt requests from the strings attached to the storage path, then control is transferred to service either the full poll sequence procedure, which would be for connection to the channel, or a limited poll sequence procedure, which is to service work internal to the controller system itself to process the device interrupts. The full poll sequence services all device interrupts, i.e., channel program devices, internal program devices, and unexpected device interrupts. The limited poll sequence responds only to interrupts from devices received from the programs within the controller system itself. Limited poll is indicated when the channel interface is busy. Every fourth time this procedure is invoked, the device work queue is checked for any queued device work. If work is found, control is transferred to the dynamic scan procedures to dispatch the device work to the device manager. In the absence of any of the above procedures, the process returns to the preempted procedure which is generally work at the level 7 or to service background tasks. The dynamic poll procedure is invoked on the level 6 by the programmable interrupt timer.

Referring to FIG. 4A, the dynamic poll procedure starts by issuing the tag for checking a particular device subsystem, i.e., either device subsystem 60 or device subsystem 62, for instance. As discussed previously in FIG. 3, the current request-ins (RQIs) are then shifted through the aging registers. The timer is set and the level 7 work that was in process is stored, such that the procedure can return after doing level 6 work to the work in process at level 7. The details of the dynamic poll procedure DYNMPL is given in table 1. The details given in the table are to satisfy the best mode requirement to show the details of the procedure to one skilled in the art and to disclose the specific procedure used in the operation of the present invention. The different tables referenced in FIG. 4A-C give the details of the process for as shown in these figures.

TABLE 1

| DYNMPL |
| --- |
| •ISSUE THE SUMMARY PULL TAG FOR CONTROLLER 'N' |
| •DETERMINE 'N' BY USING LAST VALUE IN BUFFER |
| /*TOGGLE CONTROLLER TO BE POLLED |
| /*FETCH ALL STATIC RQI'S |
| /*RAISE DDC POLL TAG |
| /*IF POLL RESULT BUFFER UPDATED,BYPASS UPDATE |
| /*SET INVALID STRING ADDRESS |
| /*STORE INITIALIZED POLL BUFFER |
| /*SET IN TRANSITION FLAG |
| •RESTART THE POLL DISPATCH TIMER |
| /*KEEP ONLY 195USEC CHANNELS |
| /*RELOAD TIME = 65 USEC |
| /*MOVE AGE130 TO AGE195 BUCKET |
| /*KEEP 130USEC & 195USEC CHANNEL |
| /*MOVE AGE65 TO AGE130 BUCKET |
| /*SET TIMER INTERRUPT |
| /*MOVE AGE0 TO AGE65 BUCKET |
| •RAISE RQI'S FOUND BY PREVIOUS POLL SCAN, AGE EXISTING DYNAMIC RQI'S. MAINTAIN STATIC RQI'S |
| /*ACC AGE0  AGE65 |
| /*ACC AGE0  AGE65  AGE130 |
| /*ACC STATICS  AGE0  AGE65  AGE130 |
| /*RAISE ALL UNSUPP INTERRUPTS |
| /*SAVE COPY OF ALL DYNAMIC RQI'S |
| •TEST RESULTS OF SUMMARY POLL |
| •VALID RESPONSE FROM CONTROLLER |
| •SAVE THE SUMMARY POLL RESULTS AND DROP POLL TAG |
| /*SAVE THE SUMMARY POLL RESULTS |
| /*PRELOAD PTR (HIGH PRIORITY Q) |
| /*DROP POLL TAG |
| /*PRELOAD PTR (HIGH PRIORITY Q) |
| •TEST CONTROLLER STATUS DATA OBJECT TO |
| •DETERMINE IF CONTROLLER IS RESPONDING FOR |
| •FIRST TIME. IF IT IS, CALL 'START CONTROLLER' |
| •VALID RESPONSE FROM THE CONTROLLER |
| •MASSAGE POLL RESULT BITS ACCORDING TO DEVICE |
| /*IF 32 DEVICE TYPE CTLR, BYPASS RESET |
| /*RESET STRING 2,3 INTRPT BITS |
| /*IF NO INTRPTS THEN BYPASS SUMMARY ANALYSIS |
| •1.1 USEC SINCE POLL TAG DROPPED |
| •STRING INTERRUPT IS DETECTED FROM SUMMARY POLL |
| •TEST HIGH PRIORITY DEVICE WORK QUEUE FOR ADDRESS |
| /*IF DEVICE WK IN HI-QUEUE THEN GO DISPATCH |

TABLE 1-continued

| DYNMPL |
| --- |
| WORK |
| •TRANSFER CONTROL TO POLL SEQUENCE PROCEDURES TO PERFORM STRING POLLS, ANALYZE POLL RESULTS, RAISE CHANNEL RQI'S FOR DEVICES SEEKING CHANNEL RECONNECT, ACCUMULATE INTERRUPTS FOR DEVICES |
| •SEEKING AN ICC PROGRAM RECONNECT OR UNEXPECTED |
| •DEVICE INTERRUPTS. |
| /*INITIALIZE STACK POINTER |
| /*TURN ON POLL ACTIVE INDICATOR |
| /*IF ON CHANNEL THEN GOTO LIMITED POLL |
| /*IF LIMITED POLL REQUIRED THEN GOTO LIMITED POLL |
| /*PRELOAD PTR (HIGH PRIORITY Q) |
| /*IF DEVICE WK IN HI-QUEUE THEN GO DISPATCH WORK |
| /*IF TIME TO BYPASS CHECK WORK Q |
| /*IF NO DYNAMIC RQI'S, CHECK DEV WORK QUEUE |
| /*PRELOAD PTR DEV WORK QUE COUNT |
| /*FETCH BYPASS DEV WORK QUE CNTR |
| /*INCREMENT QUEUE COUNTER |
| /*STORE UPDATED COUNTER VALUE |
| /*IF TIME TO DISPATCH QUEUED WK, CHECK WORK QUEUE |
| •DYNAMIC RQI'S RAISED AND DEVICE |
| •WORK QUEUE COUNTER HAS NOT EXPIRED OR THIS PASS |
| •DOES NOT CHECK FOR QUEUED DEVICE WORK. BYPASS |
| •CHECKING AND DROP OFF LEVEL 6. |
| •NO INTERRUPTS SURFACED BUT THERE IS QUEUED DEVICE WORK, START TRANSFER TO DYNAMIC SCAN MODULE. |
| •NO INTERRUPTS SURFACED, NO QUEUED DEVICE WORK, RESTORE JAS REGISTERS, DROP OFF LEVEL 6. |
| •NO STRING INTERRUPTS DETECTED FROM SUMMARY POLL |
| •DROP OFF LEVEL 6. |
| •INVOKE THE HIGH-QUEUE DEVICE POLLING ROUTINE. |
| •CTLRN START OR END CONTROLLER DETECTED. IF NO HIGH QUEUE WORK, TRANSFER TO DYNERPEI |

Referring to FIG. 4A, a decision block 102 checks to see if there are any interrupts present in the checking of this device subsystem. If there are none the no line is taken to check to see if there is any high Q work required as shown in decision block 104. The high Q work is the servicing of a high priority request. If there is high priority work in the queue, the yes line out of the decision block 104 is taken to block 106, which shows that the high priority requests are serviced in the process known for use in prior art controllers. If there are no high priority requests, the no line is taken to a decision block 108 where a check is made to see if this is the fourth time for the procedure through dynamic poll. As was shown for FIG. 3, the fourth time through the boiling procedure occurs at time T4 which is essentially a repeat of the cycling as starting at time T0. The only difference being is that at time T0, the initialization steps are taken, whereas at time T4 requests for interrupts might have been sensed and the interrupts might be being processed through the channel RQI and the delay 1, 2 and 3 aging registers. The aging process continues to repeat through the timing cycle as was previously discussed. If this was not the fourth time through the dynamic poll, the no line is taken from decision block 108 to a block 110 to return to level 7 where the background tasks are serviced. In the block 110, the control returns from interrupt level 6, which is the level at which the dynamic poll sequence operates, and returns to level 7 to continue work with the background tasks.

If, however, it is the fourth time for the dynamic poll, the yes line is taken from decision block 108 to go to decision block 112 where the summary work in the queue is checked. If there is no summary work in the queue, the no line is taken from the decision block 112 to go to block 110 where the background tasks are serviced. If there is summary work in the queue, the yes line is taken from the decision block 112 to go to a dynamic scan procedure as shown in block 114. The dynamic scan procedure is shown in FIG. 4B and will be discussed later.

If there are interrupts present at the start of the dynamic poll procedure, the yes line is taken from the decision block 102 to a decision block 116 where the determination is made whether the channel is already busy with a control unit. If the channel is already busy with the control unit, a yes line from the decision block 116 goes to block 118 where a limited summary poll is taken. In a limited summary poll, only work internal to the controller is checked since the channel is required for connection to the control unit is already busy and only work internal to the control unit can be performed. Therefore, only the devices that have work ready for connection to the controller are checked. If the channel is not busy and connection can be made to the channel, then the no line from the decision block 116 is taken to go to a block 120 where a full summary poll is followed to check for any interrupts, whether for connection to the channel or internal to the controller.

The limited summary poll procedure LSUMPL is disclosed in table 2 and will be discussed first. The limited summary poll procedure analyzes the results of the summary poll tag to search for interrupts which can be serviced without connection to the channel. The procedure determines which string is to be polled and issues the tag. The procedure then builds and stacks a program to control polling and analyzes the subsequent strings. It only issues a poll tag and builds program for strings that are disconnected from an internal controller chain. Any interrupts for external reconnection to the channel or unexpected interrupts are ignored. The procedure continues from block 118 to block 122 to go to the limited string poll procedure LSTRPL, the details of which are shown in table 3.

TABLE 2

| LSUMPL |
|---|
| •ENTRY LIMITED SUMMARY POLL ANALYSIS |
| •SUMMARY POLL PARTIALLY ANALYZED |
| •FETCH INTERNAL SUMMARY EDI'S |
| /*COPY SUMMARY TAG JUST ISSUED |
| /*SET JAS POINTER TO EDI VECTOR |
| /*FETCH SUMMARY INTERNAL EDI'S |
| /*IF ANALYZING CTLR0 THEN BYPASS MOVE CTLR1 DATA |
| /*ELSE MOVE CTLR1/DEV0 ADDRESS |
| /*SAVE CONTROLLER TYPE/ACTIVE |
| /*READ SUMMARY INTERNAL EDI'S |
| /*SET JAS INTERNAL EDI |
| /*IF NO EXPECTED INTRPTS THEN GOTO DYNAMIC SCAN |
| •FETCH EDI'S FOR STRING 1 THEN COMPUTE NEXT POLL |
| TAG ADDRESS UNDER 880 NSEC JAS WAIT |
| /*FETCH CTLRN/STR1 EDI'S |
| /*SET POLL = STR3 |
| /*IF NO INTRPT STRO STR1 THEN GO TEST STR2&STR3 |
| /*SET POLL = STRO |
| /*IF INTRPTS FROM STRO THEN BYPASS SET POLL STR3 |
| /*ELSE SET POLL = STR1 |
| /*GO READ STR1 EDI'S |
| /*IF NO INTRPTS FROM STR2, TEST NEXT STRING |

TABLE 2-continued

| LSUMPL |
|---|
| /*ELSE SET POLL = STR2 |
| /*READ STR1 EDI'S |
| •FETCH EDI'S AND RAISE NEXT POLL TAG |
| /*FETCH EDI'S |
| /*LOAD POLL ADDRESS |
| /*RAISE STRING POLL TAG |
| /*SET TAG TO ISSUE AS POLL |
| /*SET UP ADDRESS OF TARGET RTN |
| /*TARGET ROUTINE ADDRESS |
| /*READ STR2 EDI'S |
| •THE SUMMARY POLL RESULTS ARE NOW ANALYZED TO |
| •DETERMINE THE NEXT SEQUENCE OF POLL TAGS TO BE |
| •ISSUED. GENERATE CONTROL STRUCTURES WHICH WILL |
| •SCHEDULE THE ISSUANCE OF THE POLL TAGS |
| •GENERATE CONTROL STRUCTURES FOR STRO POLL |
| /*FETCH CTLR0/STR3 EDI'S |
| /*IF NO STRO INTRPT, BYPASS STORE DATA ON STACK |
| /*STACK POLL TAG ADDRESS |
| /*STACK STRING POLL SUBRTN ADDR |
| /*STACK DEV0 ADDR & EDI'S |
| •GENERATED CONTROL STRUCTURES FOR STR1 POLL |
| /*SET POLL = STR1 |
| /*IF NO STR1 INTRPT, TEST STRING 2 INTERRUPT |
| /*MOVE STR1 EDI'S TO WORK REG |
| /*STACK POLL TAG ADDRESS |
| /*STACK STRING POLL SUBRTN ADDR |
| /*STACK DEV0 ADDR & EDI'S |
| •GENERATE CONTROL STRUCTURES FOR STR2 POLL |
| /*SET POLL = STR2 |
| /*IF NO STR2 INTRPT, TEST STRING 3 INTERRUPT |
| /*MOVE STR2 EDI'S TO WORK REG |
| /*STACK POLL TAG ADDRESS |
| /*STACK STRING POLL SUBRTN ADDR |
| /*STACK DEV0 ADDR & EDI'S |
| •GENERATE CONTROL STRUCTURES FOR STR3 POLL |
| /*SET POLL = STR3 |
| /*IF NO STR3 INTRPT,SET UP QUEUE SCAN |
| /*READ STR3 EDI'S |
| /*STACK POLL TAG ADDRESS |
| /*STACK STRING POLL SUBRTN ADDR |
| /*STACK DEV0 ADDR & EDI'S |
| •GENERATE CONTROL STRUCTURES FOR QUEUE SCAN |
| /*SET TAG TO ISSUE AS NO TAG |
| /*SET POLL = SUMMARY CTLR |
| /*SET DYNAMIC SCAN AS NEXT TARGET SUBROUTINE |
| /*STACK POLL TAG ADDRESS |
| /*CLEAR INIT INTERNAL INTERRUPT SUMMARY |
| /*GOTO NEXT TARGET SUBROUTINE |
| •NO EXPECTED INTERNAL INTERRUPTS FOUND. XFER CONTROL TO DYNSCN TO START ANY QUEUED DEVICE WORK. |

TABLE 3

| LSTRPL |
|---|
| •VALID RESPONSE FROM CONTROLLER SAVE THE DEVICE |
| •INTERRUPTS, DROP THE POLL TAG AND SAVE ANY |
| •INTERNAL INTERRUPTS |
| /*GET THE DEVICE INTERRUPTS |
| /*COPY STRING'S STARTING DEV ADDR |
| /*DROP POLL TAG |
| /*DETERMINE THE STRING BY SHIFING RIGHT 3 TIMES |
| /*GET OFFSET INTO INTERNAL INTERRUPT TABLE |
| /*GET MASK OF STRING |
| /*SAVE ONLY EXPECTED INTERRUPTS |
| /*PUT ADDRESS ON BUS OUT |
| /*RAISE NEXT TAG |
| /*SAVE ONLY THE INTERNAL INTERRUPTS |
| /*PROCESS INTERNAL INTER FOUND |
| /*SET POLL RESULT BUFFER UPDATED |
| •RAISE NEXT POLL TAG AND HOLD TAG HIGH |

TABLE 3-continued
LSTRPL

BEFORE TRANSFERRING TO NEXT TARGET
SUBROUTINE.

The limited string poll procedure of block 122 drops the string in poll tag issued by the invoking procedure and analyzes the string poll results. From the analysis of the results, the procedure determines which devices are interrupting on behalf of the channel program that uses expected interrupt commands stored in the shared control array, which devices are interrupting on behalf of an internal controller operation, and which devices are presenting an unexpected interrupt. The internal interrupts are summarized by a bit significant string mask. The actual internal interrupts found are stored in a location in memory store. The device interrupts for a channel are stored in the poll results buffer. No channel request-in signals (RQIs) are accumulated or raised. Further, unexpected interrupts are ignored by the limited string poll procedure. After the limited string poll procedure of block 122 the process continues to the block 114 to go to the dynamic scan procedure of FIG. 4B.

The full summary poll procedure FSUMPL of block 120 is shown in table 4. The full summary poll procedure analyzes the results of the summary poll tag. It determines which string is to be polled and issues the tag. The procedure then builds and stacks a program to control polling and completes the analysis of subsequent strings. All strings with an interrupt are serviced. The interrupts could be for a channel program reconnection, an internal controller reconnection, or an unexpected device interrupt, such as a pack change. The full summary poll procedure of block 120 then goes to a full string poll procedure as shown in block 124.

TABLE 4
FSUMPL

*FETCH EXTERNAL EDI'S FOR STRING 0
*RAISE NEXT POLL TAG
/*COPY SUMMARY TAG JUST ISSUED
/*SET JAS POINTER TO EDI VECTOR
/*IF ANALYZING CTLR0, BYPASS MOVE CTLR1 DATA
/*ELSE MOVE CTLR1 DATA
/*OFFSET BY CTLRN/STR0 ADDRESS
/*IF NO INTRPT STR0  STR1, TEST STR2&STR3
/*SET POLL TAG = STR1
/*IF NO INTRPTS FROM STR0, RAISE POLL FOR STR1
/*ELSE SET POLL TAG = STR1
/*POLL TAG = STR0   STR1
/*RAISE POLL TAG
/*GO READ STR0 EDI'S
/*SET POLL TAG = STR2
/*IF INTRPTS FROM STR2, RAISE STR2 POLL TAG
/*ELSE SET POLL TAG = STR3
/*POLL TAG = STR2   STR3
/*RAISE POLL TAG
/*IF CTLR0 POLL, BYPASS MOVE CTLR0 ADDR
/*ELSE MOVE CTLR1 DEVO ADDR
/*READ STR0 EDI'S
/*SAVE STRING TAG JUST ISSUED
*FETCH EDI'S FOR STRING 1
*COMPUTE NEXT POLL TAG ADDRESS
/*FETCH CTLR0/STR1 EDI'S
/*IF POLLING CTLR 0, BYPASS MOVE OF CTLR 1
/*SAVE ACTIVE FLAG AND CTLR TYPE
/*READ STR1 EDI'S
*SUMMARY POLL RESULTS ARE ANALYZED TO
DETERMINE NEXT SEQUENCE OF POLL TAGS.
CONTROL STRUCTURES SCHEDULE ISSUANCE OF
THE POLL TAG AND POLL RESULTS ARE GENERATED
AND STORED IN POLL STACK

TABLE 4-continued
FSUMPL

*FETCH EDI'S FOR STR2 - GENERATE CONTROL
STRUCTURES FOR A STR0 POLL SEQUENCE
/*FETCH CTLR/STR2 EDI'S
/*INITIALIZE STACK POINTER
/*SET NEXT TARGET ROUTINE ADDR
/*SET NEXT TAG TO ISSUE IS POLL
/*IF STR0 INTRPT THEN GO STACK CONTROL DATA
/*ELSE BYPASS STACK
/*STACK POLL TAG ADDRESS
/*STACK STRING POLL SUBRTN ADDR
/*STACK DEVO ADDR & EDI'S
/*READ STR2 EDI'S
*FETCH EDI'S FOR STR3 - GENERATE CONTROL
STRUCTURES FOR A STR1 POLL SEQUENCE
/*FETCH CTLR/STR3 EDI'S
/*ADJUST DEVO ADDR. FOR STR1
/*SET STR1 POLL TAG ADDRESS
/*IF STR1 INTRPT THEN GO STORE DATA IN STACK
/*GO READ STR3 EDI'S
/*STACK POLL TAG ADDRESS
/*STACK STRING POLL SUBRTN ADDR
/*STACK DEVO ADDR & EDI'S
/*READ STR3 EDI'S
*GENERATE CONTROL STRUCTURES FOR A STR2
POLL
/*SET POLL - STR2
/*IF NO STR2 INTRPT THEN BYPASS STACKING DATA
/*STACK POLL TAG ADDRESS
/*STACK STRING POLL SUBRTN ADDR
/*STACK DEVO ADDR & EDI'S
*GENERATE CONTROL STRUCTURES FOR STR3 POLL
/*SET POLL = STR3
/*IF NO STR3 INTRPT THEN BYPASS STACKING DATA
/*STACK POLL TAG ADDRESS
/*STACK TARGET SUBROUTINE ADDR
/*STACK DEVO ADDR & EDI'S
*GENERATE CONTROL STRUCTURES FOR QUEUE
SCAN SET
*HIGH FETCH MODE FOR FULL STRING POLL.
/*FETCH UACB INTERRUPT PENDING
/*SET NEXT TAG TO ISSUE AS NULL
/*SET POLL = CTLR SUMMARY
/*SET DYNAMIC SCAN AS NEXT TARGET SUBROUTINE
/*STACK POLL TAG ADDRESS
/*STACK TARGET SUBROUTINE ADDR
/*CLEAR INIT INTERNAL INTERRUPT SUMRY
/*REINIT POLL STACK PTR, BYPASS FIRST POLL TAG
/*GOTO NEXT TARGET SUBROUTINE

The full string poll procedure FSTRPL of block 124 is disclosed in table 5. The full string poll procedure drops the string N poll tag issued by the invoking procedure and analyzes the string poll results. From the analysis of the results, the full string poll procedure determines which devices are interrupting on behalf of a channel program, which devices are interrupting on behalf of an internal controller operation, and which devices are presenting an unexpected interrupt. The interrupts on behalf of a channel program are, the expected external interrupts stored in the shared control array. An expected interrupt can be from a specific device which was found in the summary poll. The identity of the specific device is stored and the procedure then checks to see which channel the device should connect to for servicing the request. Thus, for the channel program interrupting devices further analysis is required. The devices interrupting for a 20 microsecond channel delay time, the channel RQI signals, are accumulated and presented to the channel during this polling cycle. The devices presenting interrupts for connection to a 65 microsecond, 130 microsecond or 195 microsecond channel are accumulated and aged. These channel RQIs are presented by the dynamic poll procedure on the next poll cycle. The internal controller device interrupts and the unexpected device interrupts are stored for a subsequent priority procedure in the device manager process. At the end of the full string poll procedure, the channel RQIs stored in the CR2 register or the 20 microsecond channel are updated. These channel identifications replace those channel identifications which have been up for 20 microseconds with the channel RQIs accumulated for this string. The interrupts proceeding through the aging process are maintained. After the full string poll procedure of the block 124, the process goes to the dynamic scan procedure of block 114.

TABLE 5

FSTRPL

```
*VALID RESPONSE FROM CONTROLLER, SAVE
DEVICE INTERRUPTS, DROP POLL TAG, CREATE BIT
MAP OF EXTERNAL INTERRUPTS USING EXPECTED
INTRPTS ANDED WITH ACTUAL DEVICE/INTERRUPTS
  /*SAVE ACTUAL DEVICE INTERRUPTS
*PROCESS INTERRUPT FOR DEVICE 'XXXX X000'B
  /*READ RQI CHANNEL MASK
  /*TRIGGER NEXT RQI FETCH
  /*IF NO EXTERNAL INTERRUPT, BYPASS RQI
  /*ELSE ACCUMULATE RQI MASK
  /*GET NEXT POLL TAG & ADDRESS
  /*LOAD NEXT POLL CODE
*PROCESS INTERRUPT FOR DEVICE 'XXXX X001'B
*CREATE BIT MAP OF INTERNAL AND UNEXPECTED
INTERRUPTS FOR THIS STRING. IF ANY EXIST
*THEN CREATE BIT SIGNIFICANT ADDRESS
  /*READ RQI CHANNEL MASK
  /*TRIGGER NEXT RQI FETCH
  /*RAISE NEXT TAG
  /*IF EXT INTERRUPT, BYPASS RESET RQI MASK
  /*ELSE RESET RQI MASK
  /*ACCUMULATE RQI MASK ADDRESS OF THIS
  STRING
*PROCESS INTERRUPT FOR DEVICE 'XXXX X010'B
  /*READ RQI CHANNEL MASK
  /*TRIGGER NEXT RQI FETCH
  /*IF EXT INTERRUPT, BYPASS RESET RQI MASK
  /*ELSE RESET RQI MASK
  /*ACCUMULATE RQI MASK
*PROCESS INTERRUPT FOR DEVICE 'XXXX X011'B
  /*READ RQI CHANNEL MASK
  /*TRIGGER NEXT RQI FETCH
  /*IF EXT INTERRUPT, BYPASS RESET RQI MASK
  /*ELSE RESET RQI MASK
  /*ACCUMULATE RQI MASK
*PROCESS INTERRUPT FOR DEVICE 'XXXX X100'B
*POLL TAG HAS BEEN DOWN TO ALLOW TAG VALID
TO FALL. RAISE NEXT POLL TAG
  /*READ RQI CHANNEL MASK
  /*TRIGGER NEXT RQI FETCH
  /*RAISE NEXT TAG
  /*IF EXT INTERRUPT, BYPASS RESET RQI MASK
  /*ELSE RESET RQI MASK
  /*ACCUMULATE RQI MASK INTERNAL INTERRUPTS
*PROCESS INTERRUPT FOR DEVICE 'XXXX X101'B
  /*READ RQI CHANNEL MASK
  /*TRIGGER NEXT RQI FETCH
  /*IF EXT INTERRUPT, BYPASS RESET RQI MASK
  /*ACCUMULATE RQI MASK
  /*ACCUMULATE SUMMARY BIT IF INTRPTS
*PROCESS INTERRUPT FOR DEVICE 'XXXX X110'B
  /*READ RQI CHANNEL MASK
  /*TRIGGER NEXT RQI FETCH
  /*STRING'S INTERNAL INTERRUPTS
  /*IF EXT INTERRUPT, BYPASS RESET RQI MASK
  /*ACCUMULATE RQI MASK
  /*SAVE INTERNAL INTRPTS FOR THIS STRING
*PROCESS INTERRUPT FOR DEVICE 'XXXX X111'B
  /*READ RQI CHANNEL MASK
  /*IF NO EXT INTERRUPT, BYPASS RQI
  /*ELSE ACCUMULATE RQI MASK
*POLL SCAN COMPLETED FOR STRING 'N' SO NOW
THE NEW
*ACCUMULATED CHANNEL REQUEST INS ARE
RAISED AND
*THE POLL RESULT BUFFER IS UPDATED.
```

TABLE 5-continued

FSTRPL

```
/*ACCUMULATE ALL RQI'S THIS POLL
/*KEEP ONLY 20 USEC RQI'S
/*SAVE NEW 20 USEC RQI'S
/*IF ODD POLL PASS, UPDATE ODD RQI'S
/*NEW RQI'S = EVEN/ODD RQI'S
/*MAINTAIN STATIC AND AGING RQI
/*RAISE NEW RQI'S
/*FLIP THE EVEN/ODD POLL STATE
/*UPDATE POLL RESULT BUFFER
/*REPLACE EVEN RQI'S = NEW RQI'S
/*SET POLL RESULT BUFFER UPDATED
/*GOTO NEXT TARGET SUBROUTINE
/*NEW RQI'S = EVEN/ODD RQI'S
/*MAINTAIN STATIC AND AGING RQI
/*RAISE NEW RQI'S
/*FLIP THE EVEN/ODD POLL STATE
/*UPDATE POLL RESULT BUFFER
/*REPLACE ODD RQI'S = NEW RQI'S
/*SET POLL RESULT BUFFER UPDATED
/*GO TO NEXT TARGET SUBROUTINE
```

Referring now to FIG. 4B, a dynamic scan procedure DYNSCN, of block 126 is shown in table 6. The dynamic device scan procedure invokes the device manager to service the device interrupts found by the polling procedure and starts the device work placed in the queues. The dynamic scan procedure follows a priority scheme when dispatching work. First, the procedure maintains any RQIs for the 20 microsecond channel. Second, the procedure services any internal interrupts. Third, the procedure maintains any RQIs for the 65, the 130, or the 195 microsecond channels. Lastly, the procedure services the queued device work requests. The channel RQIs for the 20 microsecond channels are aged on interrupt level 3. A round-robin scan of the internal interrupts is used to select the next device to be connected to the device manager for servicing the internal interrupt request. When no dynamic RQIs are active or the dispatch queued work counter has expired, the round-robin scan is used to pick the next device work request to service the procedures queued in the device manager for servicing the internal controller work. The work is only dispatched when there are no outstanding interrupts for the device. Entry point number two of the priority scheme is used to check for both internal interrupts and queued device work. Entry point number four of the priority scheme is used to check for queued device work when the dynamic poll procedure has found queued work, but no device interrupts are found during its processing. The aging of the 20 microsecond channel RQIs operates at interrupt level 3. The hardware timer value for the next poll cycle is also set at this time.

TABLE 6

DYNSCN

```
*TEST FOR ANY INTERNAL INTERRUPTS POLLED.
  /*IF NO INTERNAL INTRPTS, TEST WORK QUEUE
*TEST FOR RESIDUE 20 USEC CHANNEL RQI'S FROM
POLL
  /*TEST FOR ACTIVE 20 USEC RQI'S
  /*IF ACTIVE THEN WAIT FOR LVL3 TO AGE THEM
*INITIALIZE GLOBAL INDICATORS AND TRANSFER
CONTROL
*TO THE INTERNAL INTERRUPT PROCESSOR. FULL
DEVICE
  *ADDRESS PUT IN REGISTER FOR DEVICE MANAGER
  /*INDICATE DEVICE WORK IN PROG
  /*FETCH STATIC RQI SUMMARY
  /*RESTORE STATIC RQI'S ONLY
  /*SAVE CURRENT INTRPT MASK
  /*BLOCK CHANNEL INTERRUPTS
```

TABLE 6-continued

DYNSCN

```
/*BLOCK POLL 20 USEC TIMER INIT
/*INIT STACK POINTER
/*SET DEVICE PROCESS ACTIVE
/*RESET POLL PROCESS ACTIVE
/*LOAD DEVICE ADDRESS
/*FETCH SPID
/*COPY SPID TO DEV MANAGER REG
/*CALL DEVICE MANAGER
/*IF THE WORK WAS STARTED GO REDOPOL
/*IF DEVICE ON HOLD, START QUEUED WORK
*DEVICE ON HOLD - LOOK FOR QUEUED DEVICE
WORK.
  /*CLEAR AGE065 RQI REGISTER
  /*READ DEVICE QUE SUMMARY BYTE
  /*CLEAR AGE130 RQI REGISTER
  /*CLEAR AGE195 RQI REGISTER
  /*CLEAR AGE020 RQI REGISTER
  /*CLEAR AGE020 RQI REGISTER
  /*FETCH STRING/DEVICE MASK
  /*INITIALIZE LOOP COUNTER
  /*IF NO QUEUED WORK, RESCHEDULE POLL
  /*START QUEUED WORK
*THIS ENTRY IS CALLED BY LIMITED SUMMARY POLL
*NO EXPECTED INTERNAL INTERRUPTS ARE FOUND.
  /*IF TIME TO CHECK QUEUE, CHECK FOR AGING
  RQI'S
  /*ELSE GO TERMINATE THIS PASS
  /*COPY 20 USEC CHANNEL MASK
  /*TEST FOR ANY AGING RQI'S
  /*IF NO AGING RQI'S THEN GO TEST FOR QUEUED
  WORK
  /*FETCH RQI OVERRIDE WORK
  /*QUEUE COUNTER
  /*INCREMENT COUNTER
  /*IF RQI OVERDIE CNTR THEN GO TEST FOR QUEUE
  WORK
  /*ELSE GO TERMINATE THIS PASS
*TEST FOR QUEUED DEVICE WORK USING ROUND
ROBIN SCAN
  /*READ DEVICE QUE SUMMARY BYTE
  /*FETCH STRING/DEVICE MASK
  /*SAVE DEVICE QUE SUMMARY BYTE
  /*IF NO WORK TERMINATE POLL PASS
  /*CALL DETERMINE QUEUED WORK SUBROUTINE
  /*IF VALID LDA, CONTINUE START QUEUED WORK
  /*NO VALID LDA TERMINATE POLL
*TEST FOR RESIDUE DYNAMIC CHANNEL RQI'S FROM
POLL
*TIMED TO REMAIN UP FOR TWO 10 USEC WINDOWS
  /*TEST FOR ANYMORE DYNAMICS
  /*IF MORE THEN WAIT FOR LVL3 TO AGE COM-
  PLETELY
*INITIALIZE GLOBAL INDICATORS AND TRANSFER
CONTROL
*TO THE QUEUED DEVICE WORK PROCESSOR
*NO DEVICE WORK OR INTERNAL INTERRUPTS
SERVICED
*PREPARE TO TERMINATE THIS PASS OF THE POLL
*PROCESS AND RETURN TO THE PREEMPTED
PROCESS
*THE INTERNAL INTERRUPT SUMMARY BYTE
INDICATES
*INTERNAL INTERRUPTS POLLED IN FOR ONE OR
MORE
*STRINGS OF DEVICES. UTILIZE A ROUND-ROBIN
SCAN
*TO FIND A DEVICE 'N' INTERRUPT TO BE DIS-
PATCHED
*TO THE DEVICE MANAGER FOR PROCESSING.
  /*IF STRING INTRPT FOUND, FIND DEVICE INTER-
  RUPT
  /*STRING SCAN MASK = N+1-> 7
  /*DEVICE SCAN MASK = 0-> 7
  /*IF STRING INTRPT FOUND, FIND DEVICE INTER-
  RUPT
  /*SET POINTER OFFSET AND FETCH RETURN BIT
  SIGNIFICANT VALUE
  /*DEVICE INTERRUPTS FOR NEXT STRING IN
  ROUND-ROBIN SCAN
  /*IF NO DEVICE INTRPT FOUND, TEST ANOTHER
  STRING
```

TABLE 6-continued

DYNSCN

```
  *NEXT DEVICE INTERNAL INTERRUPT
  *FOUND. COMPILE FULL BINARY ADDRESS OF
  DEVICE
  *UPDATE ROUND-ROBIN STRING SCAN TO DEVICE
  N+1
  /*RESTORE DEVICE 'N' BIT ADDR
  /*DEVICE MASK = N+1 -> 7
  /*IF N=7, DEVICE MASK = 0-> 7 STRING MASK =
  M+1
  /*IF M=7 THEN STRING MASK = 8
  /*UPDATE ROUND-ROBIN SCAN MASKS
  /*RETURN MAINLINE
*THE DEVICE WORK QUEUE SUMMARY BYTE
INDICATES
*QUEUED WORK UTILIZE A ROUND-ROBIN SCAN TO
FIND
*A QUEUED DEVICE 'N' TO BE DISPATCHED TO THE
*DEVICE MANAGER FOR PROCESSING.
*A DEVICE WITH QUEUED WORK HAS BEEN FOUND
*COMPILE THE FULL BINARY ADDRESS OF THE
DEVICE
*UPDATE ROUND-ROBIN STRING SCAN MASKS TO
N+3
  /*RETURN TO BIT SIGNIFICANT VALUE
  /*DEVICE MASK = N+1 THRU 7
  /*IF DEVICE N=7 THEN DEVICE MASK = 0 THRU 7
  /*STRING MASK = M+1 WHEN M=7 THEN CARRY
  WILL SET STRING MASK=80X
  /*STORE UPDATED DEVICE/STRING MASK
*THERE IS WORK QUEUED FOR DEVICE 'N'. IF INTER-
RUPT, ALLOW JAS ONLY OPERATIONS.
  /*IF NO INTERRUPT PENDING, DISPATCH WORK
  /*IF REQUEST IN DEV QUEUE DISPATCH QUEUED
  WORK
  /*SAVE Q OFFSET INDICATOR
  /*IF NO VALID Q OFFSET, COMPLETE IN PROGRESS
  BYPASS
  /*PTR THE CORRECT QUEUE'S FUNCT
  /*RETURN MAINLINE
  /*NO QUEUED WORK FOUND
  /*RETURN MAINLINE
```

In FIG. 4B, after the dynamic scan procedure of block 126, the procedure continues to a decision block 128 when the procedure checks for internal interrupts and queued work. If there are none the control returns to interrupt level 7 to service the background tasks, as shown in block 130. If there are internal interrupts or if there is work in the queue, the yes line from the decision block 128 takes the procedure to a block 132 where the control is transferred to the device manager to service the work requested that is internal to the controller. The internal work requirements of the controller can be, for instance, service a cache connection, issue device locate operations, or make connection to the non-volatile store.

The procedure for the response of the channel to the RQI signal is shown in FIG. 4C, starting in a block 134. In the response of the channel to the RQI as shown in the block 134, the channel manager invokes a scan routine as shown in a block 136. The next step in the procedure as shown in a block 138 is to perform a scan routine. The scan routine is shown in more detail in table 7. The scan dynamic interrupt subroutine of table 7 scans the poll results buffers built by the dynamic poll procedure shown in FIG. 3 and 4A. Based on the type of the channel responding to the interrupts found in the polling procedure, anywhere from 2 to 16 words are interrogated. The logical device is determined and the UACB for this device is also interrogated. The interrupts found for this storage path are scanned to find an interrupt for the specified channel. When a match is found, the scan is complete and the device is connected to the channel.

TABLE 7
SCAN

*COPY SELECTING CHANNEL MASK AND STORAGE PATH ID
*TO PRIMARY PAGE BEFORE SWITCHING TO POLL PROCESS
*SECONDARY REGISTER PAGE TO SEARCH FOR DYNAMIC
*INTERRUPTS.
*TEST FOR 20 USEC CHANNEL INTERRUPT
/*IF NOT 20 USEC CHANNEL, TEST OTHER RQI'S
/*IF 20 USEC INTRPT THEN GO SCAN POLRSLTS BUFFER
/*IF NO 20 USEC INTRPT, EXIT WITH NO DEVICE
*20 USEC SYNCHRONOUS INTERRUPT DETECTED NOW SEARCH
*FOR DEVICE IN POLRSLTS. CHECK A MAXIMUM OF TWO
*POLL RESULT BUFFER WORDS
*RETURNS ONLY IF NO DEVICE IS FOUND
*THE SELECTING CHANNEL IS NOT IN THE 20 USEC RQI
*BUCKET SO NOW TEST FOR ANY INTERRUPT FOR THIS
*CHANNEL IN AGE195 BUCKET
*CHANNEL MATCH FOUND IN AGE195 BUCKET. ALIGN
*POINTER TO MODUL04 BOUNDARY OF THE 4 POLRSLTS
*WORDS ASSOCIATED WITH DEVICE INTERRUPTS
*APPROACHING 195 USEC OLD
*RETURNS ONLY IF NO DEVICE IS FOUND FOR THIS
*CHANNEL SELECTION SINCE HAVE ALREADY DONE
*AGE130 BOUNDARY CHECK AGE65.
/*CHECK AGE65 BOUNDARY
/*IF NO MATCH IN AGE130 THEN GO TEST AGE65
/*ALIGN TO 130 USEC BOUNDARY
/*BOUNDARY WRAP ALIGNMENT
*RETURNS ONLY IF NO DEVICE IF FOUND
/*IF NO MATCH IN AGE65, EXIT WITH NO DEVICE
/*ALIGN TO 65 USEC BOUNDARY
/*BOUNDARY WRAP ALIGNMENT
*THE SELECTING CHANNEL IS NOT IN THE 20 OR 195
*RQI BUCKET SO NOW TEST FOR ANY INTERRUPT FOR
*THIS CHANNEL IN AGE130 BUCKET
/*IF NO MATCH IN AGE130, TEST AGE65 BUCKET
*CHANNEL MATCH FOUND IN AGE130 BUCKET. ALIGN
*POINTER TO MODUL04 BOUNDARY OF THE 4 POLRSL
*WORDS ASSOCIATED WITH DEVICE INTERRUPTS
*APPROACHING 130 USEC OLD.
*RETURNS ONLY IF NO DEVICE IS FOUND FOR THIS
*CHANNEL SELECTION SINCE HAVE ALREADY DONE
*AGE65 BOUNDARY GO EXIT NO DEVICE FOUND.
/*EXIT WITH NO DEVICE FOUND
/*IF NO MATCH IN AGE65, EXIT WITH NO DEVICE
/*ALIGN TO 065 USEC BOUNDARY
/*BOUNDARY WRAP ALIGNMENT
*THE SELECTING CHANNEL IS NOT IN THE 20, 195,
*OR 130 RQI BUCKET SO NOW TEST FOR ANY INTERRUPT
*FOR THIS CHANNEL IN AGE65 BUCKET
/*IF NO MATCH IN AGE65, EXIT WITH NO DEVICE
*CHANNEL MATCH FOUND IN AGE65 BUCKET. ALIGN
*POINTER TO MODUL04 BOUNDARY OF THE 4 POLRSLTS
*WORDS ASSOCIATED WITH DEVICE INTERRUPTS
*APPROACHING 65 USEC OLD.
*RETURNS ONLY IF NO DEVICE IS FOUND
*SCAN 1TO4 WORDS IN POLRSL BUFFER FOR A DEVICE
*WITH A 'CHANNEL REQUEST IN' THAT MATCHES THE
*CURRENTLY SELECTED CHANNEL. IF AN ELIGIBLE
*DEVICE IS FOUND AND THE DEVICE UACB IS CAPTURED
*THEN CONTROL IS RETURNED TO THE CALLER. OTHERWISE RETURN CONTROL TO MAINLINE.
*ENTRY 1:
*USES INPUT VALUE TO ALIGN PTR (POLRSL) TO MODUL04

TABLE 7-continued
SCAN

*BOUNDARY OF THE 4 WORDS TO BE SCANNED
*ENTRY 2:
*FETCHES 1 TO 4 WORDS TO BE SCANNED BY INTERNAL
*SUBROUTINE FOR DEVICE THAT HAS 'CHANNEL REQUEST
*IN' THAT MACHINES CURRENTLY SELECTED CHANNEL.
/*IF NOT ON A BOUNDARY, ALIGN TO BOUNDARY +N
/*IF POINTER NOT UPDATED, MUST BE AT BOUNDARY +N
/*ELSE BACK OFF BOUNDARY +N+1
/*ALIGN TO BOUNDARY +N OR +N+1
/*ALIGN TO BOUNDARY +0
/*BOUNDARY WRAP ALIGNMENT
*POLRSL BOUNDARY ALIGNMENT DONE SO NOW SEARCH FOR
*DEVICE IN POLRSL. CHECK A MAXIMUM OF FOUR POLL
*RESULT BUFFER WORDS.
*RETURNS ONLY IF NO DEVICE IS FOUND.
*SCANS ONE WORD IN THE POLRSL BUFFER FOR DEVICE
*WITH A 'CHANNEL REQUEST IN' THAT MATCHES THE
*CURRENTLY SELECTED CHANNEL. IF AN ELIGIBLE
*DEVICE IS FOUND AND THE DEVICE UACB IS CAPTURED
*THEN CONTROL IS RETURNED TO CHANNEL MANAGER.
/*ISOLATE THE SP INDEX
/*INDEX INTO SP INTERRUPT PENDING
/*OFFSET TO PENDING INTERRUPTS
*TEST POLRSL FOR ANY DEVICES
*DEVICE FOUND IN BUFFER. SEE IF THE DEVICE HAS A
*PENDING INTERRUPT FOR THE SELECTING CHANNEL.
/*ADD FIRST DEVICE IN STRING
/*FETCH PENDING INTERRUPT BYTE
/*RESTORE DEVICE NUMBER
/*REMOVE CURRENT DEVICE FROM POLRSL CANDIDATES
/*READ INTERRUPT PENDING BYTES
/*IF NOT ON THIS CHANNEL, TEST FOR ANOTHER DEVICE
*CURRENT DEVICE ADDRESS WITH EXTERNAL DEVICE
*INTERRUPT SECONDARY OF A DUPLEX PAIR, RETURN
*POINTING TO ADDRESS OF PRIMARY PAIR
*A DEVICE IS FOUND IN POLL RESULT BUFFER. IF THE
*UNIT ADDRESS LOCK CAN BE TAKEN, THEN EXIT. ELSE, SCAN NEXT DEVICE
*AN ELIGIBLE DEVICE WAS FOUND FOR THIS CHANNEL AND
*THE UALOCK# TAKEN. RETURN TO THE CALLER OF THE
*MODULE READY TO PROCEED WITH THIS SELECTION.
/*RESET DEVICE BUSY
/*RC = DEVICE FOUND
*NO DEVICE WORK IN THIS BUFFER LOCATION. RETURN
*TO MAINLINE
/*RESTORE DEVICE ADDRESSES
/*RESET THIS ADDRESS
/*IF ANY ADDRESSES SCAN AGAIN, RETURN TO MAINLINE IN THIS MODULE
*ALL BUFFERS FOR THIS CHANNEL HAVE BEEN PROCESSED
*AND THERE IS NO ELIGIBLE DEVICE. SET RETURN CODE
* = NO DEVICE AND RETURN TO CALLER.

The channel request-in (RQI) signal update timer procedure is shown in detail in table 8. The channel RQI update timer procedure receives control every 11 microseconds at time T1 to check the 20 microsecond channel RQI signals. Every next time T, the procedure times the request-ins to age the interrupt via the programmable interrupt timer. The procedure operates on interrupt level 3 concurrent with the channel request. The channel RQIs are aged and any RQIs that have expired are dropped.

TABLE 8

POLTMR

*RESTART THE POLL DISPATCH TIME
*THE POLL DUTY CYCLE IS 11 USEC
*UPDATE THE 20 USEC RQI'S IN CR2
*RETURN FROM INTERRUPT
/*TIMER = 11 USECONDS
/*INCREMENT POLTIMER
/*IF ODD POLL PASS, UPDATE ODD RQI'S
/*REFRESH ODD RQI'S
/*REFRESH STATIC AND AGING RQI'S
/*RESTORE CURRENT RQI'S - EVEN
/*RESET EVEN RQI'S
/*TOGGLE EVEN/ODD POLL PASS
/*IF NO ACTIVE 20 USEC RQI, ABORT TIMING
/*ACCUMULATE ALL 20 USEC RQI'S
/*COPY ALL REQUEST INS
/*TURN OFF 20 USEC RQI'S
/*REMOVE 20 USEC RQI'S FROM CR2
/*MAINTAIN STATIC RQI'S
/*UPDATE REQUEST INS
/*ZERO 20 USEC AGING BUCKETS
/*GO SET POLL TIMER GIVE BACK
/*REFRESH EVEN RQI'S
/*REFRESH STATIC RQI'S
/*RESTORE CURRENT RQI'S - ODD
/*RESET ODD RQI'S
/*TOGGLE EVEN/ODD POLL PASS
/*IF NO ACTIVE 20 USEC RQI, ABORT TIMING
/*SET TIME INTERRUPT TO GIVE BACK TIME
/*RFI

The summary polls of blocks 118 and 120 of FIG. 4A for limited and full summary polls are stored in the command table. The control is transferred to the string polls via the command table. The command table has the information for the string polls to tell the procedure that is required and that parameters of the procedure. The summary poll procedures build the command table that then controls the operation of the string poll procedures. The number of times the string poll procedures are called is controlled by the command table.

The high queue work of the block 104 states that, for some reason, servicing of one particular drive is of high priority. Generally, a particular channel, called at a selector channel, requests access to a device. The selector channel requires connection and waits for connection to a particular device. The selector channel therefore, must be serviced at a high priority because the channel can do no other work until it is serviced in connection with a particular device. No other device is to be satisfied until the selector channel has been serviced. The selector channel is waiting for connection to the selected device. The normal procedure is that a selector channel is not requesting device access for a specific task, so the dynamic poll procedure continues.

The summary work is checked in the queue, as shown in block 112, only every fourth time through the dynamic poll so that the work proceeding at level 7 is not held up any longer then is necessary. As is shown is FIG. 2A, the time for checking whether there is summary work in the queue takes 17 microseconds, as shown at reference numeral 300 and 312. At the time periods 304, 308 and 310, only the polling procedure is taken, which for the preferred embodiment takes 8 microseconds of the 65 microseconds timing. Thus the summary work in queue is only checked every fourth cycle, as is shown in FIG. 2A.

While the invention has been particularly shown and described with reference to preferred embodiments thereof, it will be understood by those skilled in the art that various changes in form and details may be made therein without departing from the spirit and scope of the invention.

What is claimed is:

1. A dynamic polling device for a controller to manage request for access signals from devices for channel connection to a central processing unit by holding the request for access signals for a time required for a delayed response from a channel while servicing the signals and permitting access to a plurality of channels, said dynamic polling device comprising:

polling means for polling the devices and adapted to receive the request for access signals;

activating means adapted for periodically activating said polling means;

aging storage means including a plurality of sections for receiving and storing the request for access signals;

shifting means controlling said aging storage means and activated by said polling means for shifting the stored request for access signals from one section to another;

time means sensing each of the devices and each of the plurality of channels for determining and storing a communication response time between each device and its channel;

means connected to receive the request for access signals from the channel and for placing the request for access signals in a particular section of said plurality of sections in said aging storage means, said placing means activated by said time means for placing the request for access signals in a particular section determined by said time means; and means controlled by said aging storage means for connecting the channel with the device if the request for access signal is stored in said aging storage means when the channel requests connection;

whereby the request for access signals are shifted out of said aging storage means by said shifting means when the request for access signal is stored in a last of the plurality of sections in said aging storage means and said shifting means is activated by said polling means.

2. A dynamic polling device as defined in claim 1 further including means for servicing background tasks during a time between receipt of a request for access signal from a device and a time for a next activation of said polling means.

3. A dynamic polling device as defined in claim 1 wherein the devices are separated into two sections and each section is polled by said polling means every other time said polling means is activated.

4. A dynamic polling device as defined in claim 1 further including a poll results buffer store having a plurality of storage areas for receiving and storing addresses representative of the devices requesting access.

5. A dynamic polling device as defined in claim 4 wherein an invalid address is placed into a subsequent buffer storage area if no further devices are requesting access.

6. A dynamic polling device as defined in claim 1 wherein a period of said activating means is 65 microseconds.

7. A dynamic polling device as defined in claim 1 wherein said activating means operates at a predetermined frequency and wherein the response for access signals are held in said aging storage means for a multiple number of the predetermined frequency.

8. A dynamic polling device as defined in claim 7 wherein the time that a request for access signal is stored in said aging storage means is three times the predetermined frequency.

9. A dynamic polling device as defined in claim 1 wherein the device to channel connections can be made over any one of four paths.

10. A machine implemented process for managing device to channel communication to permit background operations while awaiting device response, said process comprising the steps of:
   starting a dynamic poll procedure;
   checking the channel for busy status in the dynamic poll procedure;
   checking a device subsection for all requests for access signals in a full summary poll procedure if the channel is found not busy, otherwise checking for internal controller work in a limited summary poll procedure if the channel is found busy;
   polling the devices for any request for access signals if in full summary poll, otherwise polling the device for internal controller requests for access signals if in limited summary poll;
   storing the request for access signals found into a shifting register according to a communication delay time between the channel and the device requesting the access;
   storing an identifier of the devices having request for access signal, otherwise storing an invalid response signal;
   connecting communication links to the channel of the device according to the stored identifier when requested by the channel;
   performing background work; and
   returning the step of checking the channel for busy status while shifting the stored request for access signals in the shift register and dropping the stored request for access signals by shifting out of the shift register when the request for access signal are located in the shift register beyond the communication delay time between the channels and the device otherwise,
   ending the dynamic poll procedure when higher priority work is requested.

11. A machine implemented process as defined in claim 10 wherein one device subsection is checked on odd steps of checking a device subsection and a second device subsection is checked on even steps of checking a device subsection.

12. A machine implemented process as defined in claim 10 wherein the step of storing an identifier, stores an invalid identifier when no devices or no further devices have request for access signals.

13. A machine implemented process as defined in claim 10 wherein stored summary work is performed every fourth time the dynamic poll procedure is taken.

14. A machine implemented process as defined in claim 10 wherein priority work is performed if no requests for access signals are sensed after starting a dynamic poll procedure.

15. A machine implemented process for managing device to channel communication to permit background operations while awaiting device response, said process comprising the steps of:
   cycling a dynamic poll procedure to check for a device requiring connection to a channel by sending a request for access signal;
   storing the request for access signal at different locations according to a communication delay time between the channel and the device sending the request for access signal;
   connecting communication links to the channel when requested by the channel; and
   dropping the stored request for access signal after the communication delay time has expired.

16. A machine implemented process as defined in claim 15 further including the step of storing an identifier of the device sending the request for access signal, otherwise storing an invalid response signal, and wherein said step of connecting communication links, connects the channel to the device according to the stored identifier when requested by the channel.

17. A machine implemented process as defined in claim 15 wherein the request for access signal stored in different locations, is stored in different positions in a shift register according to the communication delay time, with the request for access signal being shifted through the shift register every time the dynamic poll procedure is cycled and the step of dropping the stored request for access signal is accomplished by shifting the request for access signal out of the shift register.

18. A controller for managing communication connections between devices an at least one central processing unit via at least one channel, said controller comprising:
   at least one storage director connected to the at least one channel and adapted to communicate with the at least one central processing unit, said storage director accepting channel commands from the at least one central processing unit via the at least one channel;
   a device subsystem connected to said at least one storage director for storing data information required by the at least one central processing unit in a plurality of devices in said device subsystem accessible by said at least one storage director; and
   a shared control array connected to said storage director and containing status information about said plurality of devices of said device subsystem;
   said at least one storage director interpreting the channel commands and responsive thereto to access said shared control array and control said devices of said device subsystem to write or retrieve data to or from said devices;
   said at least one storage director including a dynamic polling device to manage a request for access signal from said devices made in response for connection to the at least one channel, said dynamic polling device polling said device subsystem to sense the request for access signal, and having means to hold the request for access signal for different periods of time depending upon a channel access communication time period between said device sending the request for access signal in said device subsystem and the at least one channel;
   said at least one storage director further including means for releasing the at least one channel and said device subsystem to permit performance of other tasks while said holding means holds the response for access signal for said device for a channel access communication time period.

19. A controller as defined in claim 18 wherein said holding means of said storage director holds a response for access signal for the channel access communication time period and then drops the request for access signal whether channel access is completed or not.

20. A controller as defined in claim 18 wherein said dynamic polling device of said storage director operates at a set frequency when polling said device subsystem and wherein the response for access signals are held for a multiple number of set frequency time periods.

21. A controller for managing communication connection between a device subsystem having a plurality of devices and a central processing unit via at least one channel, said controller comprising:
at least one storage director adapted to communicate with the central processing unit via the at least one channel, said at least one storage director accepting channel commands and responsive thereto to access and control the devices of the device subsystem; and
a shared control array connected to said storage director and containing status information about the devices and the device subsystem;
said at least one storage director including a dynamic polling device to manage request for access signals from the devices made in response for connection to the at least one channel received by said at least one storage director, said dynamic polling device polling the device subsystem to sense request for access signal and having means to hold a response for access signal for different periods of time depending upon a channel access communication period of time between the devices sending the request for access signal in the device subsystem and the at least one channel and contained in said shared control array;
said at least one storage director further including means for releasing the at least one channel and the device subsystem to permit performance of other tasks while said holding means holds the response for access signal for the device for the channel access communication period of time.

22. A controller as defined in claim 21 wherein said holding means of said storage director holds the response for access signal for the channel access communication connection period of time and then drops the request for access signal whether channel access is completed or not.

23. A controller as defined in claim 21 wherein said dynamic polling device of said storage director operates at a set frequency when polling said device subsystem and wherein the response for access signals are held for a multiple number of set frequency time periods.

24. A controller as defined in claim 21 further including internal storage units and wherein said dynamic polling device manages requests for access from the devices made in response for connection to said internal storage units.

25. A controller as defined in claim 24 wherein said dynamic polling device conducts a full summary poll to manage the request for access signal between the device subsystem and either the at least one channel or said internal storage units.

26. A controller as defined in claim 24 wherein said dynamic polling device conducts a limited summary poll to manage request for access signals between only the device subsystem and said internal storage units when the at least one channel is busy.

27. A dynamic polling unit for managing a request for access signal from a device in a device subsystem made in response to connection requests from a central processing unit via a channel and from storage units of the device, said dynamic polling device comprising:
polling means for polling the device to sense the request for access signal;
holding means receiving the request for access signal sensed by said polling means and responsive thereto for retaining the request for access signal for different periods of time depending upon a channel access communication period of time between the device sending the request for access signal and the channel; and
means adapted to sense said holding means for releasing the channel and the device subsystem to permit performance of other tasks while said holding means holds the request for access signal for the device for the channel access communication period of time.

28. A dynamic polling device as defined in claim 27 wherein said holding means holds the request for access signal for the channel access communication period of time and then drops the request for access signal whether access is completed or not.

29. A dynamic polling device as define in claim 27 wherein said dynamic polling device operates at a set frequency when polling said device subsystem and wherein the request for access signals are held for a multiple number of set frequency time periods.

30. A dynamic polling device as defined in claim 27 wherein said dynamic polling device conducts a full summary poll to manage the request for access signal between the device subsystem and either the channel or the storage units of the device.

31. A dynamic polling device as defined in claim 27 wherein said dynamic polling device conducts a limited summary poll to manage request for access signals between only the device subsystem and the storage units when the channel is busy.

32. A machine implemented process for managing device to channel communication to permit lower priority operations while awaiting device response, said process comprising the steps of:
starting a dynamic poll procedure to find devices requiring connection to a channel;
checking a device subsection for a request for access signal;
storing the request for access signal in a shift register according to a communications delay time between the channel and a device sending the request for access signal;
shifting the stored request for access signal through the shift register each device checking step;
connecting communication links between the device and the channel when requested by the channel; and
dropping the stored request for access signal by shifting the signal out of the shift register.

33. A machine implemented process as defined in claim 32 further including the step of storing an identifier of the devices producing the request for access signals, otherwise storing an invalid response signal, and wherein said step of connecting communication links, connects the channel to the device according to the stored identifier when requested by the channel.

34. A data processing system for managing communication with at least one central processing unit through at least one of a plurality of channels; said system comprising:

at least one controller connected to receive data and commands from the central processing unit or units, through the channels; and at least one device subsystem each having a plurality of devices for storing information accessible by said controller for use by the at least one central processing unit;

said controller each including at least one storage director adapted to communicate with the channels connected to the controller containing said storage director and accepting channel commands and data from the channels, and a shared control array connected to one of said at least one storage director and containing status information about said devices of said at least one device subsystem;

said storage director interpreting the channel commands and responsive thereto to access said shared control array and control operations of said devices to write or retrieve data to or from said devices;

said storage director including;

a dynamic polling means for managing request for access signals from the devices in said at least one device subsystem made in response to connection requests received by said storage director from the channels and for polling the devices to sense a request for access signal;

holding means for storing the request for access signals sensed by said dynamic polling means and responsive thereto to retain the request for access signal for different periods of time depending upon a channel access communication period of time between the device sending the request for access signal and the at least one of the plurality of channels;

means for releasing the at least one of the plurality of channels and the device subsystem to permit performance of background tasks while said holding means stores the request for access signal from the device for the channel access communication period of time; and means for connecting communication between the channel and a device sending the request for access signal when the at least one of the plurality of channels sends a connection command to said storage director.

35. A data processing system as defined in claim 34 wherein said holding means of said storage director holds the request for access signal for the channel access communication period of time and then drops the request for access signal whether channel access is completed or not.

36. A data processing system as defined in claim 34 wherein said dynamic polling device of said storage director operates at a set frequency when polling said device subsystem and wherein the request for access signals are held for a multiple number of set frequency time periods.

37. A data processing system as defined in claim 34 further including internal controller storage units and wherein said dynamic polling means manages requests for access from the devices made in response for connection to said internal controller storage unit.

38. A controller as defined in claim 37 wherein said dynamic polling means conducts a full summary poll to manage request for access signals between the devices of the device subsystem and either the at least one of the plurality of channels or said internal controller storage units.

39. A controller as defined in claim 37 wherein said dynamic polling means conducts a limited summary poll to manage request for access signals between only the devices said internal controller storage units when the at least one of the plurality of channels is busy.

40. A data processing system as defined in claim 34 wherein each controller supports a plurality of device subsystems and each device subsystem is polled sequentially by said dynamic polling means.

41. A data processing system as defined in claim 34 wherein said holding means stores an identifier of the devices having request for access signals.

42. A data processing system as defined in claim 41 wherein an invalid address is placed into said holding means if no further devices have request for access signals.

43. A data processing system as defined in claim 34 wherein said holding means includes an aging shifting register, with the request for access signal being stored in an aging shift register in different areas of the register according to different periods of time and shifted in the aging shift register every cycle of said dynamic polling means.

* * * * *

UNITED STATES PATENT AND TRADEMARK OFFICE
CERTIFICATE OF CORRECTION

PATENT NO. : 5,201,053
DATED : April 6, 1993
INVENTOR(S) : Michael T. Benhase, et al.

It is certified that error appears in the above-identified patent and that said Letters Patent is hereby corrected as shown below:

At column 31, line 43, after the word "returning", insert the word --to--.

At column 36, line 30, after the word "devices", insert the word --and--.

Signed and Sealed this

Twenty-sixth Day of April, 1994

*Attest:*

BRUCE LEHMAN

*Attesting Officer*     *Commissioner of Patents and Trademarks*